United States Patent [19]
Bader

[11] Patent Number: 5,467,471
[45] Date of Patent: Nov. 14, 1995

[54] MAINTAINING DATABASES BY MEANS OF HIERARCHICAL GENEALOGICAL TABLE

[76] Inventor: David A. Bader, 161 Cherry Hill Rd., Nazareth, Pa. 18064

[21] Appl. No.: 29,268

[22] Filed: Mar. 10, 1993

[51] Int. Cl.⁶ .................................................. G06F 17/30
[52] U.S. Cl. .................. 395/600; 364/419.07; 364/974; 364/974.3; 364/974.4; 364/283.2; 364/283.4; 364/DIG. 1; 364/DIG. 2
[58] Field of Search .................................. 395/600, 700, 395/500, 425; 364/419.07

[56] References Cited

U.S. PATENT DOCUMENTS

| | | | |
|---|---|---|---|
| 5,062,074 | 10/1991 | Kleinberger | 345/600 |
| 5,086,504 | 2/1992 | Nemeth-Johannes et al. | 395/700 |
| 5,295,256 | 3/1994 | Bapat | 395/500 |
| 5,295,261 | 3/1994 | Simonetti | 395/600 |

OTHER PUBLICATIONS

Korth & Silbertschatz, *Database System Concepts*, McGraw-Hill, (New York, 1986), pp. 44–105.

*Primary Examiner*—Thomas G. Black
*Assistant Examiner*—Paul R. Lintz
*Attorney, Agent, or Firm*—Meltzer, Lippe, Goldstein

[57] ABSTRACT

The present invention describes a system and method for maintaining databases. An ordered genealogy table is provided for implying hierarchical relations on an as-needed basis. The invention further provides relational search capabilities to a hierarchical database. The invention also allows a database that is maintained on a computer system in a hierarchical structure to be converted into a database that is maintained in a relational structure, and vice versa. In addition, the invention may be used with currently existing hierarchical and relational databases. The invention provides a plurality of records; a unique identifier for each of the records; a database for maintaining the records; and a table which contains one or more table entries, wherein each table entry contains a genealogy including the unique identifier of a particular record and the unique identifiers of any records that can be considered ancestors of that particular record in a hierarchy, and wherein the table entries are sorted in collating sequence according to their genealogies.

15 Claims, 69 Drawing Sheets

Search Criteria

Last Name=Smith

Figure 4a

Genealogy Table

|  | Criteria # | Level 1 | Level 2 | Level 3 | Level 4 |
|---|---|---|---|---|---|
| Entry 1 | 1 | 13 | 87 | 201 |  |
| Entry 2 | 1 | 13 | 87 | 215 |  |
| Entry 3 | 1 | 91 | 88 | 66 | 342 |
| Entry 4 | 1 | 91 | 88 | 287 | 500 |

Figure 4b

Genealogy Table

|  | Criteria # | Level 1 | Level 2 | Level 3 | Level 4 |
|---|---|---|---|---|---|
| Previous Entry → (Does not exist) | | | | | |
| Current Entry → Entry 1 | 1 | 13 | 87 | 201 | |
| Entry 2 | 1 | 13 | 87 | 215 | |
| Entry 3 | 1 | 91 | 88 | 66 | 342 |
| Entry 4 | 1 | 91 | 88 | 287 | 500 |

Figure 4c

Hit Table    (at beginning of BREAK process)

| Criteria # | Level 1 | Level 2 | Level 3 | Level 4 |
|---|---|---|---|---|
| 1 | FALSE | FALSE | FALSE | FALSE |

Figure 4d

Hit Table    (after CLEAR process)

| Criteria # | Level 1 | Level 2 | Level 3 | Level 4 |
|---|---|---|---|---|
| 1 | FALSE | FALSE | FALSE | FALSE |

Figure 4e

Hit Table    (after PROPAGATE process)

| Criteria # | Level 1 | Level 2 | Level 3 | Level 4 |
|---|---|---|---|---|
| 1 | FALSE | FALSE | FALSE | FALSE |

Figure 4f

Hit Table    (after SET process)

| Criteria # | Level 1 | Level 2 | Level 3 | Level 4 |
|---|---|---|---|---|
| 1 | FALSE | FALSE | TRUE | TRUE |

Figure 4g

Genealogy Table

|  | Criteria # | Level 1 | Level 2 | Level 3 | Level 4 |
|---|---|---|---|---|---|
| Previous Entry → Entry 1 | 1 | 13 | 87 | 201 |  |
| Current Entry → Entry 2 | 1 | 13 | 87 | 215 |  |
| Entry 3 | 1 | 91 | 88 | 66 | 342 |
| Entry 4 | 1 | 91 | 88 | 287 | 500 |

Figure 4h

Hit Table    (at beginning of BREAK process)

| Criteria # | Level 1 | Level 2 | Level 3 | Level 4 |
|---|---|---|---|---|
| 1 | FALSE | FALSE | TRUE | TRUE |

Figure 4i

Hit Table    (after CLEAR process)

| Criteria # | Level 1 | Level 2 | Level 3 | Level 4 |
|---|---|---|---|---|
| 1 | FALSE | FALSE | FALSE | FALSE |

Figure 4j

Hit Table    (after PROPAGATE process)

| Criteria # | Level 1 | Level 2 | Level 3 | Level 4 |
|---|---|---|---|---|
| 1 | FALSE | FALSE | FALSE | FALSE |

Figure 4k

Hit Table    (after SET process)

| Criteria # | Level 1 | Level 2 | Level 3 | Level 4 |
|---|---|---|---|---|
| 1 | FALSE | FALSE | TRUE | TRUE |

Figure 4l

Genealogy Table

|  | Criteria # | Level 1 | Level 2 | Level 3 | Level 4 |
|---|---|---|---|---|---|
| Entry 1 | 1 | 13 | 87 | 201 |  |
| Previous Entry → Entry 2 | 1 | 13 | 87 | 215 |  |
| Current Entry → Entry 3 | 1 | 91 | 88 | 66 | 342 |
| Entry 4 | 1 | 91 | 88 | 287 | 500 |

Figure 4m

Hit Table    (at beginning of BREAK process)

| Criteria # | Level 1 | Level 2 | Level 3 | Level 4 |
|---|---|---|---|---|
| 1 | FALSE | FALSE | TRUE | TRUE |

Figure 4n

Hit Table    (after CLEAR process)

| Criteria # | Level 1 | Level 2 | Level 3 | Level 4 |
|---|---|---|---|---|
| 1 | FALSE | FALSE | FALSE | FALSE |

Figure 4o

Hit Table    (after PROPAGATE process)

| Criteria # | Level 1 | Level 2 | Level 3 | Level 4 |
|---|---|---|---|---|
| 1 | FALSE | FALSE | FALSE | FALSE |

Figure 4p

Hit Table    (after SET process)

| Criteria # | Level 1 | Level 2 | Level 3 | Level 4 |
|---|---|---|---|---|
| 1 | FALSE | FALSE | FALSE | TRUE |

Figure 4q

Genealogy Table

|  | Criteria # | Level 1 | Level 2 | Level 3 | Level 4 |
|---|---|---|---|---|---|
| Entry 1 | 1 | 13 | 87 | 201 |  |
| Entry 2 | 1 | 13 | 87 | 215 |  |
| Previous Entry → Entry 3 | 1 | 91 | 88 | 66 | 342 |
| Current Entry → Entry 4 | 1 | 91 | 88 | 287 | 500 |

Figure 4r

Hit Table (at beginning of BREAK process)

| Criteria # | Level 1 | Level 2 | Level 3 | Level 4 |
|---|---|---|---|---|
| 1 | FALSE | FALSE | FALSE | TRUE |

Figure 4s

Hit Table (after CLEAR process)

| Criteria # | Level 1 | Level 2 | Level 3 | Level 4 |
|---|---|---|---|---|
| 1 | FALSE | FALSE | FALSE | FALSE |

Figure 4t

Hit Table (after PROPAGATE process)

| Criteria # | Level 1 | Level 2 | Level 3 | Level 4 |
|---|---|---|---|---|
| 1 | FALSE | FALSE | FALSE | FALSE |

Figure 4u

Hit Table (after SET process)

| Criteria # | Level 1 | Level 2 | Level 3 | Level 4 |
|---|---|---|---|---|
| 1 | FALSE | FALSE | FALSE | TRUE |

Figure 4v

Genealogy Table

| | Criteria # | Level 1 | Level 2 | Level 3 | Level 4 |
|---|---|---|---|---|---|
| Entry 1 | 1 | 13 | 87 | 201 | |
| Entry 2 | 1 | 13 | 87 | 215 | |
| Entry 3 | 1 | 91 | 88 | 66 | 342 |
| Previous Entry → Entry 4 | 1 | 91 | 88 | 287 | 500 |
| Current Entry → (Does not exist) | | | | | |

Figure 4w

Hit Table      (at beginning of BREAK process)

| Criteria # | Level 1 | Level 2 | Level 3 | Level 4 |
|---|---|---|---|---|
| 1 | FALSE | FALSE | FALSE | TRUE |

Figure 4x

Hit Table      (after CLEAR process)

| Criteria # | Level 1 | Level 2 | Level 3 | Level 4 |
|---|---|---|---|---|
| 1 | FALSE | FALSE | FALSE | FALSE |

Figure 4y

Hit Table      (after PROPAGATE process)

| Criteria # | Level 1 | Level 2 | Level 3 | Level 4 |
|---|---|---|---|---|
| 1 | FALSE | FALSE | FALSE | FALSE |

Figure 4z

Hit Table      (after SET process)

| Criteria # | Level 1 | Level 2 | Level 3 | Level 4 |
|---|---|---|---|---|
| 1 | FALSE | FALSE | FALSE | FALSE |

Figure 4za

Search Criteria

Company=ACME Distributing
Last Name=Williams
Department=Shipping

Figure 5a

Genealogy Table

| | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Entry 3 | 3 | 13 | 102 | 412 | |
| Entry 4 | 2 | 91 | 88 | | |
| Entry 5 | 3 | 91 | 88 | 122 | 140 |

Figure 5b

Genealogy Table

|  | Criteria # | Level 1 | Level 2 | Level 3 | Level 4 |
|---|---|---|---|---|---|
| Previous Entry → (Does not exist) | | | | | |
| Current Entry → Entry 1 | 1 | 13 | | | |
| Entry 2 | 2 | 13 | 102 | | |
| Entry 3 | 3 | 13 | 102 | 412 | |
| Entry 4 | 2 | 91 | 88 | | |
| Entry 5 | 3 | 91 | 88 | 122 | 140 |

Figure 5c

Hit Table   (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5d

Hit Table   (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5e

Hit Table   (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5f

Hit Table   (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 5g

Genealogy Table

|  | Criteria # | Level 1 | Level 2 | Level 3 | Level 4 |
|---|---|---|---|---|---|
| Previous Entry → Entry 1 | 1 | 13 | | | |
| Current Entry → Entry 2 | 2 | 13 | 102 | | |
| Entry 3 | 3 | 13 | 102 | 412 | |
| Entry 4 | 2 | 91 | 88 | | |
| Entry 5 | 3 | 91 | 88 | 122 | 140 |

Figure 5h

Hit Table     (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 5i

Hit Table     (after CLEAR process)

| Criteria # | Level 1 | Level 2 | Level 3 | Level 4 |
|---|---|---|---|---|
| 1 | TRUE | FALSE | FALSE | FALSE |
| 2 | FALSE | FALSE | FALSE | FALSE |
| 3 | FALSE | FALSE | FALSE | FALSE |

Figure 5j

Hit Table     (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 5k

Hit Table     (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 5l

Genealogy Table

|  | Criteria # | Level 1 | Level 2 | Level 3 | Level 4 |
|---|---|---|---|---|---|
| Entry 1 | 1 | 13 | | | |
| Previous Entry → Entry 2 | 2 | 13 | 102 | | |
| Current Entry → Entry 3 | 3 | 13 | 102 | 412 | |
| Entry 4 | 2 | 91 | 88 | | |
| Entry 5 | 3 | 91 | 88 | 122 | 140 |

Figure 5m

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 5n

Hit Table    (after CLEAR process)

| Criteria # | Level 1 | Level 2 | Level 3 | Level 4 |
|---|---|---|---|---|
| 1 | TRUE | TRUE | FALSE | FALSE |
| 2 | FALSE | TRUE | FALSE | FALSE |
| 3 | FALSE | FALSE | FALSE | FALSE |

Figure 5o

Hit Table    (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 5p

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | TRUE | TRUE |

Figure 5q

Genealogy Table

|  | Criteria # | Level 1 | Level 2 | Level 3 | Level 4 |
|---|---|---|---|---|---|
| Entry 1 | 1 | 13 |  |  |  |
| Entry 2 | 2 | 13 | 102 |  |  |
| Previous Entry → Entry 3 | 3 | 13 | 102 | 412 |  |
| Current Entry → Entry 4 | 2 | 91 | 88 |  |  |
| Entry 5 | 3 | 91 | 88 | 122 | 140 |

Figure 5r

Hit Table  (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | TRUE | TRUE |

Figure 5s

Hit Table  (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5t

Hit Table  (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5u

Hit Table  (after SET process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 5v

Genealogy Table

|  | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Entry 3 | 3 | 13 | 102 | 412 | |
| Previous Entry → Entry 4 | 2 | 91 | 88 | | |
| Current Entry → Entry 5 | 3 | 91 | 88 | 122 | 140 |

Figure 5w

Hit Table (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 5x

Hit Table (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | FALSE |
| 3 | FALSE | FALSE | FALSE | FALSE |

Figure 5y

Hit Table (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 5z

Hit Table (after SET process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | TRUE |

Figure 5za

Genealogy Table

|  | Criteria # | Level 1 | Level 2 | Level 3 | Level 4 |
|---|---|---|---|---|---|
| Entry 1 | 1 | 13 |  |  |  |
| Entry 2 | 2 | 13 | 102 |  |  |
| Entry 3 | 3 | 13 | 102 | 412 |  |
| Entry 4 | 2 | 91 | 88 |  |  |
| Previous Entry → Entry 5 | 3 | 91 | 88 | 122 | 140 |
| Current Entry → (Does not exist) |  |  |  |  |  |

Figure 5zb

Hit Table     (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | TRUE |

Figure 5zc

Hit Table     (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5zd

Hit Table     (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5ze

Hit Table     (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 5zf

Search Criteria

Last Name=Williams
Department=Shipping

Figure 6a

Genealogy Table

|  | Criteria # | Level 1 | Level 2 | Level 3 | Level 4 |
|---|---|---|---|---|---|
| Entry 1 | 1 | 13 | 102 |  |  |
| Entry 2 | 2 | 13 | 102 | 412 |  |
| Entry 3 | 1 | 91 | 88 |  |  |
| Entry 4 | 2 | 91 | 88 | 122 | 140 |

Figure 6b

Genealogy Table

| | Criteria # | Level 1 | Level 2 | Level 3 | Level 4 |
|---|---|---|---|---|---|
| Previous Entry → (Does not exist) | | | | | |
| Current Entry → Entry 1 | 1 | 13 | 102 | | |
| Entry 2 | 2 | 13 | 102 | 412 | |
| Entry 3 | 1 | 91 | 88 | | |
| Entry 4 | 2 | 91 | 88 | 122 | 140 |

Figure 6c

Hit Table   (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6d

Hit Table   (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6e

Hit Table   (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6f

Hit Table   (after SET process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6g

Genealogy Table

|  | | Criteria # | Level 1 | Level 2 | Level 3 | Level 4 |
|---|---|---|---|---|---|---|
| Previous Entry → | Entry 1 | 1 | 13 | 102 | | |
| Current Entry → | Entry 2 | 2 | 13 | 102 | 412 | |
| | Entry 3 | 1 | 91 | 88 | | |
| | Entry 4 | 2 | 91 | 88 | 122 | 140 |

Figure 6h

Hit Table     (at beginning of BREAK process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6i

Hit Table     (after CLEAR process)

| Criteria # | Level 1 | Level 2 | Level 3 | Level 4 |
|---|---|---|---|---|
| 1 | FALSE | TRUE | FALSE | FALSE |
| 2 | FALSE | FALSE | FALSE | FALSE |

Figure 6j

Hit Table     (after PROPAGATE process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6k

Hit Table     (after SET process)

| Criteria # | Level 1 | Level 2 | Level 3 | Level 4 |
|---|---|---|---|---|
| 1 | FALSE | TRUE | TRUE | TRUE |
| 2 | FALSE | FALSE | TRUE | TRUE |

Figure 6l

Genealogy Table

|  | Criteria # | Level 1 | Level 2 | Level 3 | Level 4 |
|---|---|---|---|---|---|
| Entry 1 | 1 | 13 | 102 | | |
| Previous Entry → Entry 2 | 2 | 13 | 102 | 412 | |
| Current Entry → Entry 3 | 1 | 91 | 88 | | |
| Entry 4 | 2 | 91 | 88 | 122 | 140 |

Figure 6m

Hit Table   (at beginning of BREAK process)

| Criteria # | Level 1 | Level 2 | Level 3 | Level 4 |
|---|---|---|---|---|
| 1 | FALSE | TRUE | TRUE | TRUE |
| 2 | FALSE | FALSE | TRUE | TRUE |

Figure 6n

Hit Table   (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6o

Hit Table   (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6p

Hit Table   (after SET process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6q

Genealogy Table

|  | Criteria # | Level 1 | Level 2 | Level 3 | Level 4 |
|---|---|---|---|---|---|
| Entry 1 | 1 | 13 | 102 | | |
| Entry 2 | 2 | 13 | 102 | 412 | |
| Previous Entry → Entry 3 | 1 | 91 | 88 | | |
| Current Entry → Entry 4 | 2 | 91 | 88 | 122 | 140 |

Figure 6r

Hit Table   (at beginning of BREAK process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6s

Hit Table   (after CLEAR process)

| Criteria # | Level 1 | Level 2 | Level 3 | Level 4 |
|---|---|---|---|---|
| 1 | FALSE | TRUE | TRUE | FALSE |
| 2 | FALSE | FALSE | FALSE | FALSE |

Figure 6t

Hit Table   (after PROPAGATE process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | FALSE |

Figure 6u

Hit Table   (after SET process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | TRUE |

Figure 6v

Genealogy Table

|  | Criteria # | Level 1 | Level 2 | Level 3 | Level 4 |
|---|---|---|---|---|---|
| Entry 1 | 1 | 13 | 102 |  |  |
| Entry 2 | 2 | 13 | 102 | 412 |  |
| Entry 3 | 1 | 91 | 88 |  |  |
| Previous Entry → Entry 4 | 2 | 91 | 88 | 122 | 140 |
| Current Entry → (Does not exist) |  |  |  |  |  |

Figure 6w

Hit Table (at beginning of BREAK process)

| Criteria # | Level 1 | Level 2 | Level 3 | Level 4 |
|---|---|---|---|---|
| 1 | FALSE | TRUE | TRUE | TRUE |
| 2 | FALSE | FALSE | FALSE | TRUE |

Figure 6x

Hit Table (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6y

Hit Table (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6z

Hit Table (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 6za

Search Criteria

Company > Spaces
Department=Shipping

Figure 7a

Genealogy Table

|  | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Entry 3 | 1 | 22 | | | |
| Entry 4 | 1 | 91 | | | |
| Entry 5 | 2 | 91 | 88 | | |

Figure 7b

Genealogy Table

|  | | Criteria # | Level 1 | Level 2 | Level 3 | Level 4 |
|---|---|---|---|---|---|---|
| Previous Entry → | (Does not exist) | | | | | |
| Current Entry → | Entry 1 | 1 | 13 | | | |
| | Entry 2 | 2 | 13 | 102 | | |
| | Entry 3 | 1 | 22 | | | |
| | Entry 4 | 1 | 91 | | | |
| | Entry 5 | 2 | 91 | 88 | | |

Figure 7c

Hit Table   (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7d

Hit Table   (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7e

Hit Table   (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7f

Hit Table   (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7g

Genealogy Table

|   | Criteria # | Level 1 | Level 2 | Level 3 | Level 4 |
|---|---|---|---|---|---|
| Previous Entry → Entry 1 | 1 | 13 | | | |
| Current Entry → Entry 2 | 2 | 13 | 102 | | |
| Entry 3 | 1 | 22 | | | |
| Entry 4 | 1 | 91 | | | |
| Entry 5 | 2 | 91 | 88 | | |

Figure 7h

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7i

Hit Table    (after CLEAR process)

| Criteria # | Level 1 | Level 2 | Level 3 | Level 4 |
|---|---|---|---|---|
| 1 | TRUE | FALSE | FALSE | FALSE |
| 2 | FALSE | FALSE | FALSE | FALSE |

Figure 7j

Hit Table    (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7k

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |

Figure 7l

Genealogy Table

|  | Criteria # | Level 1 | Level 2 | Level 3 | Level 4 |
|---|---|---|---|---|---|
| Entry 1 | 1 | 13 | | | |
| Previous Entry → Entry 2 | 2 | 13 | 102 | | |
| Current Entry → Entry 3 | 1 | 22 | | | |
| Entry 4 | 1 | 91 | | | |
| Entry 5 | 2 | 91 | 88 | | |

Figure 7m

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |

Figure 7n

Hit Table    (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7o

Hit Table    (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7p

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7q

Genealogy Table

| | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Previous Entry → Entry 3 | 1 | 22 | | | |
| Current Entry → Entry 4 | 1 | 91 | | | |
| Entry 5 | 2 | 91 | 88 | | |

Figure 7r

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7s

Hit Table    (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7t

Hit Table    (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7u

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7v

Genealogy Table

|  | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Entry 3 | 1 | 22 | | | |
| Previous Entry → Entry 4 | 1 | 91 | | | |
| Current Entry → Entry 5 | 2 | 91 | 88 | | |

Figure 7w

Hit Table     (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7x

Hit Table     (after CLEAR process)

| Criteria # | Level 1 | Level 2 | Level 3 | Level 4 |
|---|---|---|---|---|
| 1 | TRUE | FALSE | FALSE | FALSE |
| 2 | FALSE | FALSE | FALSE | FALSE |

Figure 7y

Hit Table     (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |

Figure 7z

Hit Table     (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |

Figure 7za

Genealogy Table

| | Criteria # | Level 1 | Level 2 | Level 3 | Level 4 |
|---|---|---|---|---|---|
| Entry 1 | 1 | 13 | | | |
| Entry 2 | 2 | 13 | 102 | | |
| Entry 3 | 1 | 22 | | | |
| Entry 4 | 1 | 91 | | | |
| Previous Entry → Entry 5 | 2 | 91 | 88 | | |
| Current Entry → (Does not exist) | | | | | |

Figure 7zb

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |

Figure 7zc

Hit Table    (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7zd

Hit Table    (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7ze

Hit Table    (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |

Figure 7zf

Search Criteria

Company=ACME Distributing
Department=Shipping
Child's Name > spaces

Figure 8a

Genealogy Table

|  | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8b

Genealogy Table

| | Criteria # | Level 1 | Level 2 | Level 3 | Level 4 |
|---|---|---|---|---|---|
| Previous Entry → (Does not exist) | | | | | |
| Current Entry → Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8c

Hit Table  (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8d

Hit Table     (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8e

Hit Table     (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8f

Hit Table     (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8g

Genealogy Table

| | Criteria # | Level 1 | Level 2 | Level 3 | Level 4 |
|---|---|---|---|---|---|
| Previous Entry → Entry 1 | 1 | 13 | | | |
| Current Entry → Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8h

Hit Table (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8i

Hit Table      (after CLEAR process)

| Criteria # | Level 1 | Level 2 | Level 3 | Level 4 |
|---|---|---|---|---|
| 1 | TRUE | TRUE | FALSE | FALSE |
| 2 | FALSE | FALSE | FALSE | FALSE |
| 3 | FALSE | FALSE | FALSE | FALSE |

Figure 8j

Hit Table      (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8k

Hit Table      (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8l

Genealogy Table

|  | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Previous Entry → Entry 3 | 3 | 13 | 87 | 201 | |
| Current Entry → Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8m

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8n

Hit Table    (after CLEAR process)

| Criteria # | Level 1 | Level 2 | Level 3 | Level 4 |
|---|---|---|---|---|
| 1 | TRUE | TRUE | FALSE | FALSE |
| 2 | FALSE | FALSE | FALSE | FALSE |
| 3 | FALSE | FALSE | FALSE | FALSE |

Figure 8o

Hit Table    (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8p

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8q

Genealogy Table

|  | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Previous Entry → Entry 5 | 3 | 13 | 87 | 215 | |
| Current Entry → Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8r

Hit Table    (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8s

Hit Table       (after CLEAR process)

| Criteria # | Level 1 | Level 2 | Level 3 | Level 4 |
|---|---|---|---|---|
| 1 | TRUE | TRUE | FALSE | FALSE |
| 2 | FALSE | FALSE | FALSE | FALSE |
| 3 | FALSE | FALSE | FALSE | FALSE |

Figure 8t

Hit Table       (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8u

Hit Table       (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8v

Genealogy Table

|  | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Previous Entry → Entry 6 | 3 | 13 | 87 | 281 | |
| Current Entry → Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8w

Hit Table  (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | TRUE | TRUE |

Figure 8x

Hit Table    (after CLEAR process)

| Criteria # | Level 1 | Level 2 | Level 3 | Level 4 |
|---|---|---|---|---|
| 1 | TRUE | FALSE | FALSE | FALSE |
| 2 | FALSE | FALSE | FALSE | FALSE |
| 3 | FALSE | FALSE | FALSE | FALSE |

Figure 8y

Hit Table    (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 8z

Hit Table    (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 8za

Genealogy Table

| | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Previous Entry → Entry 7 | 2 | 13 | 102 | | |
| Current Entry → Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8zb

Hit Table   (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 8zc

Hit Table       (after CLEAR process)

| Criteria # | Level 1 | Level 2 | Level 3 | Level 4 |
|---|---|---|---|---|
| 1 | TRUE | TRUE | FALSE | FALSE |
| 2 | FALSE | TRUE | FALSE | FALSE |
| 3 | FALSE | FALSE | FALSE | FALSE |

Figure 8zd

Hit Table       (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | FALSE | FALSE |

Figure 8ze

Hit Table       (after SET process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | TRUE | TRUE |

Figure 8zf

Genealogy Table

| | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Previous Entry → Entry 9 | 3 | 13 | 102 | 412 | |
| Current Entry → Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Entry 14 | 3 | 91 | 88 | 287 | 366 |

Figure 8zg

Hit Table  (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | TRUE | TRUE | TRUE |
| 3 | FALSE | FALSE | TRUE | TRUE |

Figure 8zh

Hit Table (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zi

Hit Table (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zj

Hit Table (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | TRUE | TRUE |

Figure 8zk

Genealogy Table

| | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Previous Entry → Entry 11 | 3 | 91 | 50 | 34 | |
| Current Entry → Entry 12 | 2 | 91 | 88 | | |
| Entry 13 | 3 | 91 | 88 | 287 | 366 |
| Entry 14 | 3 | 91 | 88 | 287 | 366 |

Figure 8zl

Hit Table    (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | TRUE | TRUE |

Figure 8zm

Hit Table    (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zn

Hit Table    (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zo

Hit Table    (after SET process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 8zp

Genealogy Table

| | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Previous Entry → Entry 12 | 2 | 91 | 88 | | |
| Current Entry → Entry 13 | 3 | 91 | 88 | 287 | 366 |
| Entry 14 | 3 | 91 | 88 | 287 | 366 |

Figure 8zq

Hit Table (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 8zr

Hit Table     (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | TRUE | FALSE | FALSE |
| 3 | FALSE | FALSE | FALSE | FALSE |

Figure 8zs

Hit Table     (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | FALSE |

Figure 8zt

Hit Table     (after SET process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | TRUE |

Figure 8zu

Genealogy Table

| | Criteria # | Level 1 | Level 2 | Level 3 | Level 4 |
|---|---|---|---|---|---|
| Entry 1 | 1 | 13 | | | |
| Entry 2 | 3 | 13 | 87 | 201 | |
| Entry 3 | 3 | 13 | 87 | 201 | |
| Entry 4 | 3 | 13 | 87 | 215 | |
| Entry 5 | 3 | 13 | 87 | 215 | |
| Entry 6 | 3 | 13 | 87 | 281 | |
| Entry 7 | 2 | 13 | 102 | | |
| Entry 8 | 3 | 13 | 102 | 412 | |
| Entry 9 | 3 | 13 | 102 | 412 | |
| Entry 10 | 3 | 91 | 50 | 34 | |
| Entry 11 | 3 | 91 | 50 | 34 | |
| Entry 12 | 2 | 91 | 88 | | |
| Entry 13 | 3 | 91 | 88 | 287 | 366 |
| Previous Entry → Entry 14 | 3 | 91 | 88 | 287 | 366 |
| Current Entry → (Does not exist) | | | | | |

Figure 8zv

Hit Table    (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | TRUE | TRUE | TRUE |
| 3 | FALSE | FALSE | FALSE | TRUE |

Figure 8zw

Hit Table      (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zx

Hit Table      (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zy

Hit Table      (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 8zz

Search Criteria (Company=Acme Distributing
OR Company=Madison Hardware)
AND Department=A/R

Figure 9a

Genealogy Table

|         | Criteria # | Level 1 | Level 2 | Level 3 | Level 4 |
|---------|------------|---------|---------|---------|---------|
| Entry 1 | 1          | 13      |         |         |         |
| Entry 2 | 3          | 13      | 42      |         |         |
| Entry 3 | 3          | 22      | 17      |         |         |
| Entry 4 | 2          | 91      |         |         |         |

Figure 9b

Genealogy Table

|  | Criteria # | Level 1 | Level 2 | Level 3 | Level 4 |
|---|---|---|---|---|---|
| Previous Entry → (Does not exist) | | | | | |
| Current Entry → Entry 1 | 1 | 13 | | | |
| Entry 2 | 3 | 13 | 42 | | |
| Entry 3 | 3 | 22 | 17 | | |
| Entry 4 | 2 | 91 | | | |

Figure 9c

Hit Table (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9d

Hit Table (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9e

Hit Table (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9f

Hit Table (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 9g

Genealogy Table

|  | Criteria # | Level 1 | Level 2 | Level 3 | Level 4 |
|---|---|---|---|---|---|
| Previous Entry → Entry 1 | 1 | 13 |  |  |  |
| Current Entry → Entry 2 | 3 | 13 | 42 |  |  |
| Entry 3 | 3 | 22 | 17 |  |  |
| Entry 4 | 2 | 91 |  |  |  |

Figure 9h

Hit Table   (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 9i

Hit Table   (after CLEAR process)

| Criteria # | Level 1 | Level 2 | Level 3 | Level 4 |
|---|---|---|---|---|
| 1 | TRUE | FALSE | FALSE | FALSE |
| 2 | FALSE | FALSE | FALSE | FALSE |
| 3 | FALSE | FALSE | FALSE | FALSE |

Figure 9j

Hit Table   (after PROPAGATE process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | FALSE | FALSE | FALSE |

Figure 9k

Hit Table   (after SET process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | TRUE | TRUE | TRUE |

Figure 9l

Genealogy Table

| | Criteria # | Level 1 | Level 2 | Level 3 | Level 4 |
|---|---|---|---|---|---|
| Entry 1 | 1 | 13 | | | |
| Previous Entry → Entry 2 | 3 | 13 | 42 | | |
| Current Entry → Entry 3 | 3 | 22 | 17 | | |
| Entry 4 | 2 | 91 | | | |

Figure 9m

Hit Table  (at beginning of BREAK process)

| Criteria # | Level 1 | Level 2 | Level 3 | Level 4 |
|---|---|---|---|---|
| 1 | TRUE | TRUE | TRUE | TRUE |
| 2 | FALSE | FALSE | FALSE | FALSE |
| 3 | FALSE | TRUE | TRUE | TRUE |

Figure 9n

Hit Table  (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9o

Hit Table  (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9p

Hit Table  (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | TRUE | TRUE | TRUE |

Figure 9q

|   | Criteria # | Level 1 | Level 2 | Level 3 | Level 4 |
|---|---|---|---|---|---|
| Entry 1 | 1 | 13 | | | |
| Entry 2 | 3 | 13 | 42 | | |
| Previous Entry → Entry 3 | 3 | 22 | 17 | | |
| Current Entry → Entry 4 | 2 | 91 | | | |

Figure 9r

Hit Table   (at beginning of BREAK process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | TRUE | TRUE | TRUE |

Figure 9s

Hit Table   (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9t

Hit Table   (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9u

Hit Table   (after SET process)

| Criteria # | Level 1 | Level 2 | Level 3 | Level 4 |
|---|---|---|---|---|
| 1 | FALSE | FALSE | FALSE | FALSE |
| 2 | TRUE | TRUE | TRUE | TRUE |
| 3 | FALSE | FALSE | FALSE | FALSE |

Figure 9v

Genealogy Table

|  | Criteria # | Level 1 | Level 2 | Level 3 | Level 4 |
|---|---|---|---|---|---|
| Entry 1 | 1 | 13 | | | |
| Entry 2 | 3 | 13 | 42 | | |
| Entry 3 | 3 | 22 | 17 | | |
| Previous Entry → Entry 4 | 2 | 91 | | | |
| Current Entry → (Does not exist) | | | | | |

Figure 9w

Hit Table    (at beginning of BREAK process)

| Criteria # | Level 1 | Level 2 | Level 3 | Level 4 |
|---|---|---|---|---|
| 1 | FALSE | FALSE | FALSE | FALSE |
| 2 | TRUE | TRUE | TRUE | TRUE |
| 3 | FALSE | FALSE | FALSE | FALSE |

Figure 9x

Hit Table    (after CLEAR process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9y

Hit Table    (after PROPAGATE process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9z

Hit Table    (after SET process)

| Criteria # | Level 1 | Level 2 | Level 3 | Level 4 |
|---|---|---|---|---|
| 1 | FALSE | FALSE | FALSE | FALSE |
| 2 | FALSE | FALSE | FALSE | FALSE |
| 3 | FALSE | FALSE | FALSE | FALSE |

Figure 9za

| DEPARTMENT | COMPANY | LOCATION | FIRST NAME | LAST NAME | CHILDREN'S NAMES | |
|---|---|---|---|---|---|---|
| PURCHASING | MADISON HARDWARE | | DENNIS | BENNET | KARL | JULIE |
| SHIPPING | MADISON HARDWARE | PHILADELPHIA | DAVID | CARREY | ANSEL | IAN |
| SHIPPING | MADISON HARDWARE | MIAMI | BARBARA | CRAY | | |
| PURCHASING | MADISON HARDWARE | | PAT | DANIELS | | |
| PERSONNEL | ACME DISTRIBUTING | | JOHN | DOE | ROGER | |
| SHIPPING | ACME DISTRIBUTING | | RAYMOND | DOE | | |
| PERSONNEL | ACME DISTRIBUTING | | ROGER | SMITH | BILLY | TOMMY |
| PERSONNEL | ACME DISTRIBUTING | | JOHN | SMITH | SALLY | RALPH |
| SHIPPING | MADISON HARDWARE | MIAMI | DON | SMITH | | |
| SHIPPING | MADISON HARDWARE | PHILADELPHIA | ROGER | SMITH | | |
| SHIPPING | MADISON HARDWARE | PHILADELPHIA | ELROY | THAMES | | |
| SHIPPING | MADISON HARDWARE | SAN FRANCISCO | TONY | WILLIAMS | | |
| SHIPPING | ACME DISTRIBUTING | | ROGER | WILLIAMS | HEATHER | ASHLY |
| A/R | ACME DISTRIBUTING | | | | | |
| A/P | ACME DISTRIBUTING | | | | | |
| PAYROLL | ACME DISTRIBUTING | | | | | |
| A/R | SMITH & WILLIAMS | | | | | |
| W/C | SMITH & WILLIAMS | | | | | |

Figure 12

DEPARTMENT

| | |
|---|---|
| A/P | 1 |
| A/R | 2 |
| A/R | |
| PAYROLL | 3 |
| PERSONNEL | 4 |
| PERSONNEL | |
| PERSONNEL | |
| PURCHASING | 5 |
| PURCHASING | |
| SHIPPING | 6 |
| SHIPPING | |
| SHIPPING | |
| SHIPPING | |
| SHIPPING | |
| SHIPPING | |
| SHIPPING | |
| SHIPPING | |
| W/C | 7 |

There are 7 unique values for the keyword DEPARTMENT

Figure 13a

COMPANY

| | |
|---|---|
| ACME DISTRIBUTING | 1 |
| ACME DISTRIBUTING | |
| ACME DISTRIBUTING | |
| ACME DISTRIBUTING | |
| ACME DISTRIBUTING | |
| ACME DISTRIBUTING | |
| ACME DISTRIBUTING | |
| ACME DISTRIBUTING | |
| | |
| MADISON HARDWARE | 2 |
| MADISON HARDWARE | |
| MADISON HARDWARE | |
| MADISON HARDWARE | |
| MADISON HARDWARE | |
| MADISON HARDWARE | |
| MADISON HARDWARE | |
| MADISON HARDWARE | |
| | |
| SMITH & WILLIAMS | 3 |
| SMITH & WILLIAMS | |

There are 3 unique values for the keyword COMPANY

Figure 13b

LAST NAME

| | |
|---|---|
| BENNET | 1 |
| CARREY | 2 |
| CRAY | 3 |
| DANIELS | 4 |
| DOE | 5 |
| DOE | |
| SMITH | 6 |
| SMITH | |
| SMITH | |
| SMITH | |
| THAMES | 7 |
| WILLIAMS | 8 |
| WILLIAMS | |

There are 8 unique values for the keyword LAST NAME

Figure 13c

| COMPANY | DEPARTMENT | LAST NAME | FIRST NAME | LOCATION | CHILDREN'S NAMES | | |
|---|---|---|---|---|---|---|---|
| MADISON HARDWARE | PURCHASING | BENNET | DENNIS | | KARL | JULIE | |
| MADISON HARDWARE | SHIPPING | CARREY | DAVID | PHILADELPHIA | ANSEL | IAN | |
| MADISON HARDWARE | SHIPPING | CRAY | BARBARA | MIAMI | | | |
| MADISON HARDWARE | PURCHASING | DANIELS | PAT | | | | |
| ACME DISTRIBUTING | PERSONNEL | DOE | JOHN | | ROGER | | |
| ACME DISTRIBUTING | SHIPPING | DOE | RAYMOND | | | | |
| ACME DISTRIBUTING | PERSONNEL | SMITH | ROGER | | BILLY | TOMMY | |
| ACME DISTRIBUTING | PERSONNEL | SMITH | JOHN | | SALLY | RALPH | |
| MADISON HARDWARE | SHIPPING | SMITH | DON | MIAMI | | | |
| MADISON HARDWARE | SHIPPING | SMITH | ROGER | PHILADELPHIA | | | |
| MADISON HARDWARE | SHIPPING | THAMES | ELROY | PHILADELPHIA | | | |
| MADISON HARDWARE | SHIPPING | WILLIAMS | TONY | SAN FRANCISCO | | | |
| ACME DISTRIBUTING | SHIPPING | WILLIAMS | ROGER | | HEATHER | ASHLY | |
| ACME DISTRIBUTING | A/R | | | | | | |
| ACME DISTRIBUTING | A/P | | | | | | |
| ACME DISTRIBUTING | PAYROLL | | | | | | |
| SMITH & WILLIAMS | A/R | | | | | | |
| SMITH & WILLIAMS | W/C | | | | | | |

Figure 13d

| COMPANY | DEPARTMENT | LAST NAME | FIRST NAME | LOCATION | CHILDREN'S NAMES | | |
|---|---|---|---|---|---|---|---|
| ACME DISTRIBUTING | A/P | | | | | | |
| ACME DISTRIBUTING | A/R | | | | | | |
| ACME DISTRIBUTING | PAYROLL | | | | | | |
| ACME DISTRIBUTING | PERSONNEL | DOE | JOHN | | ROGER | | |
| ACME DISTRIBUTING | PERSONNEL | SMITH | JOHN | | SALLY | RALPH | |
| ACME DISTRIBUTING | PERSONNEL | SMITH | ROGER | | BILLY | TOMMY | |
| ACME DISTRIBUTING | SHIPPING | DOE | RAYMOND | | | | |
| ACME DISTRIBUTING | SHIPPING | WILLIAMS | ROGER | | HEATHER | ASHLY | |
| MADISON HARDWARE | PURCHASING | BENNET | DENNIS | | KARL | JULIE | |
| MADISON HARDWARE | PURCHASING | DANIELS | PAT | | | | |
| MADISON HARDWARE | SHIPPING | CARREY | DAVID | PHILADELPHIA | ANSEL | IAN | |
| MADISON HARDWARE | SHIPPING | CRAY | BARBARA | MIAMI | | | |
| MADISON HARDWARE | SHIPPING | SMITH | DON | MIAMI | | | |
| MADISON HARDWARE | SHIPPING | SMITH | ROGER | PHILADELPHIA | | | |
| MADISON HARDWARE | SHIPPING | THAMES | ELROY | PHILADELPHIA | | | |
| MADISON HARDWARE | SHIPPING | WILLIAMS | TONY | SAN FRANCISCO | | | |
| SMITH & WILLIAMS | A/R | | | | | | |
| SMITH & WILLIAMS | W/C | | | | | | |

Figure 13e

MAINTAINING DATABASES BY MEANS OF HIERARCHICAL GENEALOGICAL TABLE

BACKGROUND OF THE INVENTION

1. Field of the Invention

This invention relates to databases, and more particularly to a system and method pertaining to hierarchical and relational databases maintained by a computer.

2. Description of the Related Art

Databases of information may be maintained on a computer in a variety of ways to facilitate searching and retrieval of particular data or information records. A database maintained with a hierarchical or "tree" structure—having at least one record as the "root" and other records as "branches" connected to the root—is an intuitive way for people to deal with data records. A hierarchical database can be analogous to nested folders of information: the "root" may be a main folder entitled "Acme Corp.", which may contain as the "branches" folders entitled "Payroll Department", "Accounting Department", and "Manufacturing Department", and each of those folders containing as further "branches" employment records for each employee in a particular department. In a hierarchical database, the root is considered to be at the highest hierarchical level, with other records in subordinate relationships to the root. Thus, a hierarchical database may be said to have a "genealogy", with records having "ancestors" and "descendants", in a particular "consanguinity" (relationship of ancestors and descendants), much as with a family tree.

A hierarchical database is typically used in conjunction with an "index structure", with which records in the hierarchy are assigned to or "indexed" with one or more attributes. The index structure may be used by a computer system to retrieve records in the hierarchy based on a search query given by a user. The index structure uses keywords such as "Company" and "Last Name", each of which contains a keyword value such as "Acme Corp." or "Smith". For example, using systems and methods in the prior art, in order to search for all employees named Smith who work at Acme Corp., all records containing a Last Name must be indexed both by Last Name and by Company. A search query using Boolean algebra is typically used to carry out the search. For the previous example, the search query would be:

Last Name=Smith AND Company=Acme Corp.

A database may also be maintained on a computer in a relational structure. In a relational database, two or more record types have an interrelational dependency: at least one attribute in each of two or more record types takes its values from a common type (or "domain") or values. For example, while one record type for "Department" could include as attributes "Department Code", "Address", and "Phone Number", another record type for "Employee" could include as attributes "Name", "Department Code", and "Home Address". All of the attributes of the record type "Employee" may be related to all of the attributes of the record type "Department" through the common attribute of "Department Code".

While hierarchical databases and relational databases can maintain records containing the same data, each type of database structure has advantages and disadvantages. For example, as noted, a hierarchical database is intuitive for people to deal with, especially when a person searches manually to find a record. However, when implemented on a computer, much more flexible searches are generally possible when the database is relationally structured rather than hierarchically structured.

Specifically, this flexibility comes about from the ability to have as user-selected search criteria any one or more attributes ("keys", "keywords", or "search keys") of any of the records, using any combination of logical or Boolean operators. In order for prior art systems and methods to provide relational search capabilities to hierarchical databases, the index structure would have to duplicate explicitly, for each record, all of the indices of all of that record's ancestors. Because the number of indices that must be examined when analyzing a search inquiry grows exponentially as the number of records grows, the redundancy that would result from implementation of such an index structure soon becomes tremendous, as does the "overhead" of computer resources that would be needed for implementing such an index structure. Therefore, such an implementation is extremely impractical for most hierarchical databases.

It would be desirable to provide a system and method for maintaining a hierarchical database that allows for the flexible searching capabilities of a relational database, while keeping the intuitive advantages of the hierarchical structure and avoiding the problems described above that result from prior art systems and methods. It would also be desirable if such a system and method further provided the capability of allowing a hierarchically structured database to be converted in a computer to a relationally structured database, and vice versa, so that the advantages of either structure could be utilized in various applications.

SUMMARY OF THE INVENTION

The present invention describes a system and method for maintaining databases that provides an "ordered genealogy table", in which each entry in the table includes the identifier of a particular database record and the identifiers of any records that could be considered ancestors of that particular record in a hierarchy, and wherein the table entries are sorted in collating sequence according to their genealogies.

The invention further describes a system and method for providing relational search capabilities to a hierarchical database without the unnecessary duplication of indices that results in the prior art. Instead, the invention uses an ordered genealogy table to imply hierarchical relationships to descendants of records without having to index each record with the keys of its ancestors. In addition, these hierarchical relationships are implied only when, and to the extent necessary for, answering a search query. Instead of growing exponentially as the number of records increases, the number of indices that must be examined in analyzing a search query grows only geometrically.

The invention also allows a database that is maintained on a computer system in a hierarchical structure to be converted using an ordered genealogy table into a database that is maintained in a relational structure. By the same token, the system and method of the invention allows a relationally structured database to be converted using an ordered genealogy table to a hierarchically structured database. Such conversions allow various computer applications to use the data in a single database in either a hierarchical or a relational structure, while allowing a computer user to maintain the database using only one structure.

In addition, the invention may be used with currently existing hierarchical and relational databases.

When an ordered genealogy table is created to contain identifiers for all the records in a database that satisfy one or more search criteria selected by a user of the system or method of the invention, a search methodology that is another aspect of the invention may be used that will provide for the hierarchical database faster results than those provided by any known search algorithm for relational databases.

Further, the invention teaches a system for maintaining a database which comprises a plurality of records; identifying means for providing a unique identifier for each of the records; database means for maintaining the records in a database; and table creation means for creating a table, which contains one or more table entries, wherein each table entry contains a genealogy comprising the unique identifier of a particular record and the unique identifiers of any records that can be considered ancestors of that particular record in a hierarchy, and wherein the table entries are sorted in collating sequence according to their genealogies.

The invention further teaches providing a second table creation means for creating a second table, which contains one or more second table entries, wherein each second table entry contains one or more variables that indicate whether or not one or more of the first table entries contains the unique identifier of a record that meets all of the search criteria; means for comparing at least two first table entries to determine if any inequality exists between them; means for determining whether or not one of the first table entries contains the unique identifier of a record that meets all of the search criteria; means for clearing one or more of the variables in one or more of the second table entries; means for propagating a value of one of the variables in one second table entry to other variables in such one second table entry; and means for setting one or more of the variables in one or more of the second table entries to a particular value.

Furthermore, the invention teaches a system for converting a database that is maintained as hierarchical to one that is relational, or for converting a database that is maintained as relational to one that is hierarchical.

Other features and advantages of the present invention will be apparent to those of skill in this art.

BRIEF DESCRIPTION OF THE DRAWINGS

FIG. 2 is a schematic diagram depicting an example of a system of pointers that can be used in a preferred embodiment of the invention for a portion of the hierarchy depicted in FIG. 1a.

FIGS. 4a–za are schematic representations of the processing undertaken by a computer system, utilizing a search methodology in accordance with a preferred embodiment of the invention, when performing a search on the hierarchy of FIGS. 1a–b using a first exemplary set of search criteria.

FIGS. 5a–zf are schematic representations of the processing undertaken by a computer system, utilizing a search methodology in accordance with a preferred embodiment of the invention, when performing a search on the hierarchy of FIGS. 1a–b using a second exemplary set of search criteria.

FIGS. 6a–za are schematic representations of the processing undertaken by a computer system, utilizing a search methodology in accordance with a preferred embodiment of the invention, when performing a search on the hierarchy of FIGS. 1a–b using a third exemplary set of search criteria.

FIGS. 7a–zf are schematic representations of the processing undertaken by a computer system, utilizing a search methodology in accordance with a preferred embodiment of the invention, when performing a search on the hierarchy of FIGS. 1a–b using a fourth exemplary set of search criteria.

FIGS. 8a–zz are schematic representations of the processing undertaken by a computer system, utilizing a search methodology in accordance with a preferred embodiment of the invention, when performing a search on the hierarchy of FIGS. 1a–b using a fifth exemplary set of search criteria.

FIGS. 9a–za are schematic representations of the processing undertaken by a computer system, utilizing a search methodology in accordance with a preferred embodiment of the invention, when performing a search on the hierarchy of FIGS. 1a–b using a sixth exemplary set of search criteria.

FIG. 12 is a schematic depiction of an example of data maintained in a relational database on a computer.

FIGS. 13a–e are schematic representations of the processing undertaken by a computer system, utilizing a conversion methodology in accordance with a preferred embodiment of the invention, to convert the relational database depicted in FIG. 11 to a hierarchical database.

DETAILED DESCRIPTION OF THE PREFERRED EMBODIMENTS

Figure 1A:
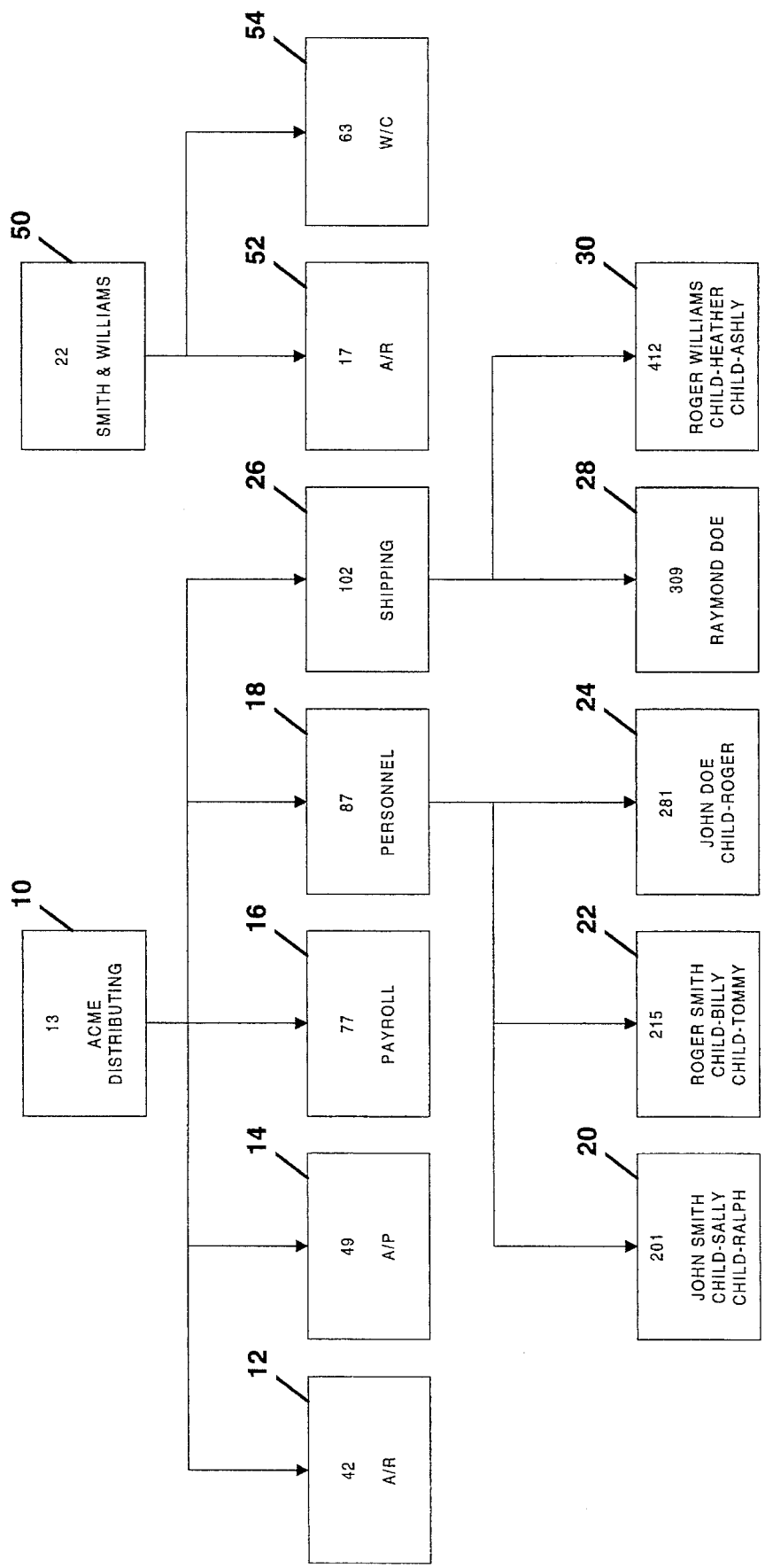
FIGS. 1a–b are schematic diagrams depicting an example of a hierarchy of data as maintained in a hierarchical database on a computer.
Figure 1B:
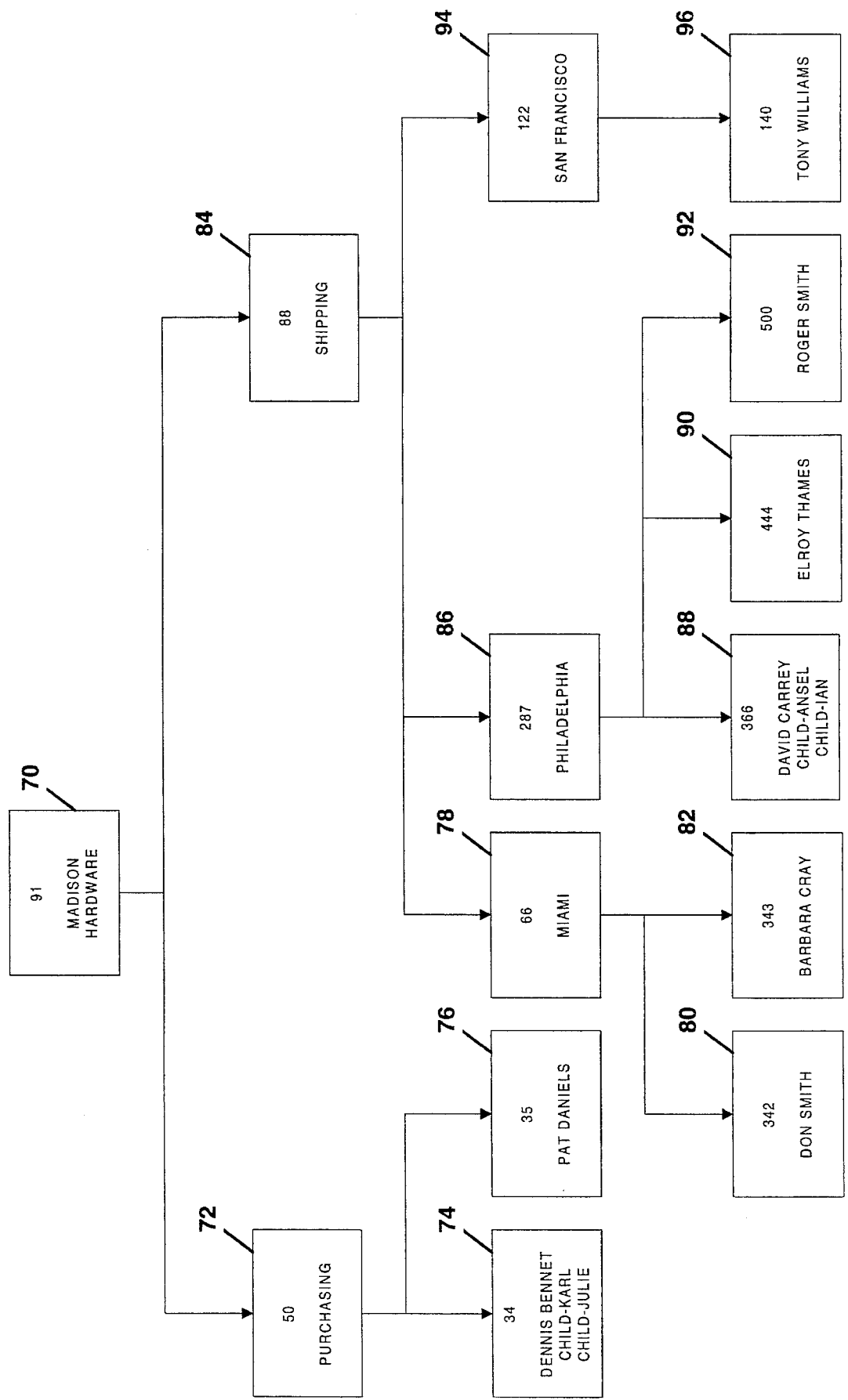

FIGS. 1a–b show schematically a plurality of records of information as maintained on a computer in a hierarchical database. FIG. 1a may be placed to the left of FIG. 1b in order to view the entire database. Each block in FIGS. 1a–b represents an information record with a unique identifier. Such blocks may be also be referred to herein by their record identifiers. For example, block 10 is a record whose unique identifier is 13; thus, block 10 may be referred to herein as record 13.

Typically, the highest level of the hierarchy is denominated as "Level 1", with each "lower" or subordinate level having a higher level number. ("Level 2", "Level 3", etc., are progressively "lower" or subordinate to "Level 1.") In FIGS. 1a and 1b, on the highest hierarchical level (Level 1) are records 13, 22, and 91 (blocks 10, 50, and 70, respectively). On the next lower hierarchical level (Level 2) are records 42, 49, 77, 87, 102, 17, 63, 50, and 88 (blocks 12, 14, 16, 18, 26, 52, 54, 72, and 84, respectively). On the next lower hierarchical level (Level 3) are records 201, 215, 281, 309, 412, 34, 35, 66, 287, and 122 (blocks 20, 22, 24, 28, 30, 74, 76, 78, 86, and 94, respectively). On the lowest hierarchical level (Level 4) are records 342, 343, 366, 444, 500, and 140 (blocks 80, 82, 88, 90, 92, and 96. As will be apparent to those of skill in the art, the hierarchy in FIGS. 1a–b is merely one example; hierarchical databases may have any number of hierarchical levels, with any number of records at each level, depending upon the limitations of the systems on which they are implemented.

Two elements are needed to implement the preferred embodiment of the invention in a database maintained on a computer. The first is a means for maintaining a hierarchy of records, each record having unique record identifiers capable of being put in ordering sequence. This preferred means for maintaining a hierarchy must include a null value that is lower than the value of all of the unique record identifiers. The preferred means for maintaining a hierarchy must further include a way to determine the genealogy (at least the ancestors) of any record.

The preferred way to determine genealogies is described below in connection with the schematic diagram of FIG. 2, which shows a system of pointers for a portion of the hierarchy depicted in FIG. 1a. The genealogy of any record is determined by providing each record in the hierarchy with up to five pointers. For each individual record, the preferred method for implementing the five pointers is as follows:

Owner record pointer—points to the owner or parent of a record in the next higher (owner or superior) hierarchical level. At the highest level, the owner pointer is set to null, but all other records must have a single valid (non-null) owner pointer.

Subordinate record pointer—points to the subordinate or child of a record in the next lower (subordinate) hierarchical level. Each record may have a single subordinate, but if it does not have a subordinate, the subordinate record pointer is set to null.

Next record pointer—points to the next record in the same hierarchical level within its genealogy, or to itself (the individual record) if no next record exists.

Previous record pointer—points to the previous record in the same hierarchical level within its genealogy, or to itself if no previous record exists.

First record pointer—points to the first record in the same hierarchical level within its genealogy. (First record pointers are not shown in FIG. 2, but are described below.)

Figure 2:
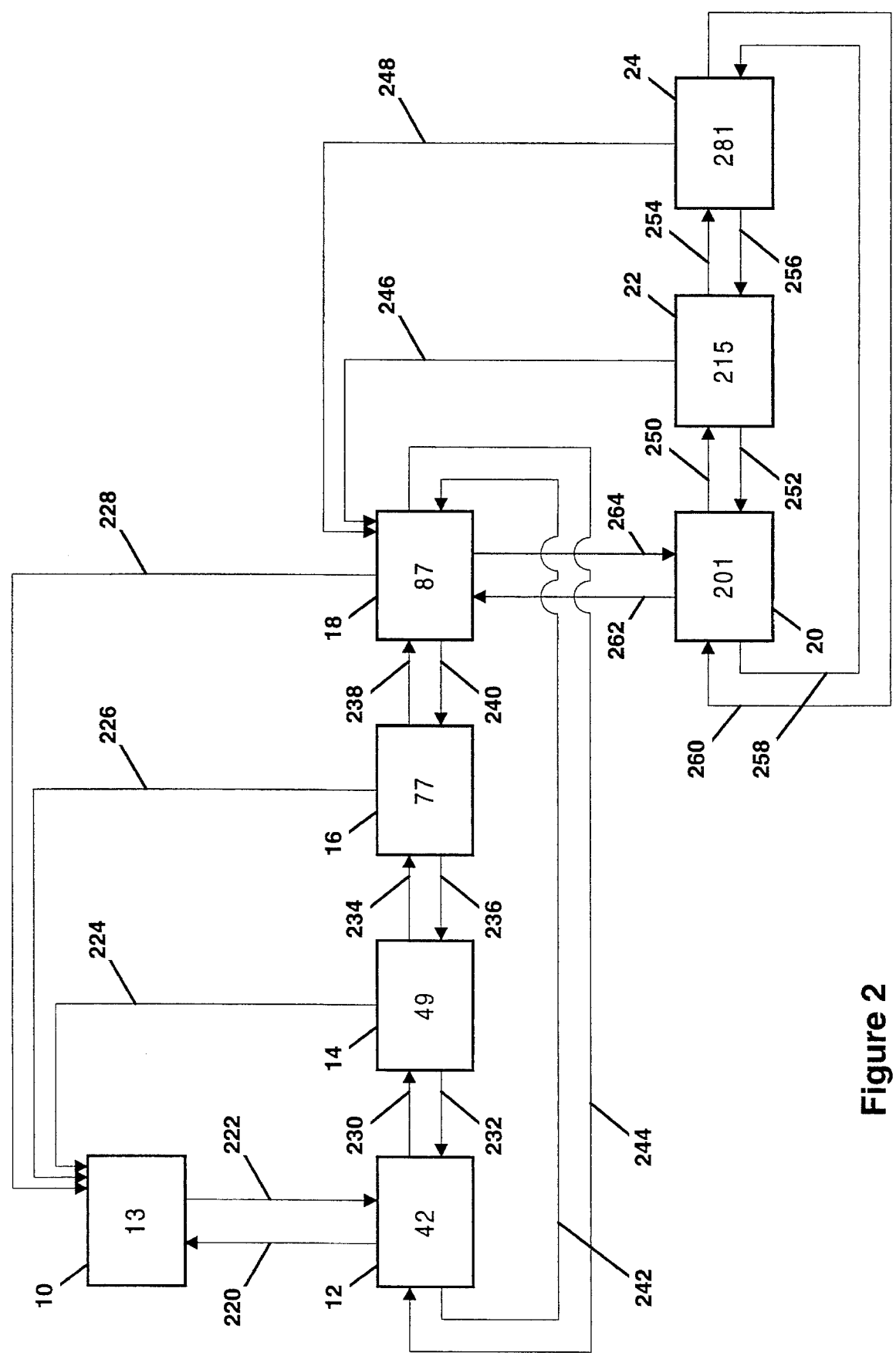

In FIG. 2, the owner record pointers are pointers 220, 224, 226, 228, 246, 248, and 262. For example, pointer 262 points from record 201 (block 20) to the owner of that record in the next higher hierarchical level, record 87 (block 18).

The subordinate record pointers are pointers 222 and 264. For example, pointer 264 points from record 87 (block 18) to a subordinate of that record in the next lower hierarchical level, record 201 (block 20).

The next record pointers are pointers 230, 234, 238, 244, 250, 254, and 260. For example, pointer 250 points from record 201 (block 210) to the next record in the same hierarchical level within its genealogy, record 215 (block 212). As will be apparent, a set of next record pointers provides a chain of each set of records on the same hierarchical level within a genealogy. Pointers 250, 254, and 260 comprise one such set of next record pointers, for records 201, 215, and 281 (blocks 210, 212, and 214, respectively).

The previous record pointers are pointers 232, 236, 240, 242, 252, 256, and 258. For example, pointer 252 points from record 215 (block 212) to the previous record in the same hierarchical level within its genealogy, record 201 (block 210). As will also be apparent, a set of previous record pointers also provides a chain of each set of records on the same hierarchical level within a genealogy. Pointers 252, 256, and 258 comprise one such set of next record pointers, for records 201, 215, and 281 (blocks 210, 212, and 214, respectively).

The first record pointers are not depicted in FIG. 2. However, as will be apparent to those of skill in the art, the first record pointers are as follows: at record 13 (block 200), a pointer to itself (i.e., record 13); at record 42 (block 202), a pointer to itself; at records 49, 77, and 88 (blocks 204, 206, and 208), pointers to record 42; at record 201 (block 210), a pointer to itself; and at records 215 and 281 (blocks 212 and 214), pointers to record 201.

Thus, in the preferred embodiment, a record may have up to five pointers. For example, record 87 (block 18) has (i) owner pointer 228, (ii) subordinate pointer 264, (iii) next record pointer 244, (iv) previous record pointer 242, and (v) a first record pointer (not shown) to record 42 (block 12).

A system and method utilizing the five pointers described above allows for dynamically creating a hierarchical database structure. Other pointer systems that may be used in conjunction with the invention will be apparent to those skilled in the art.

Figure 3:
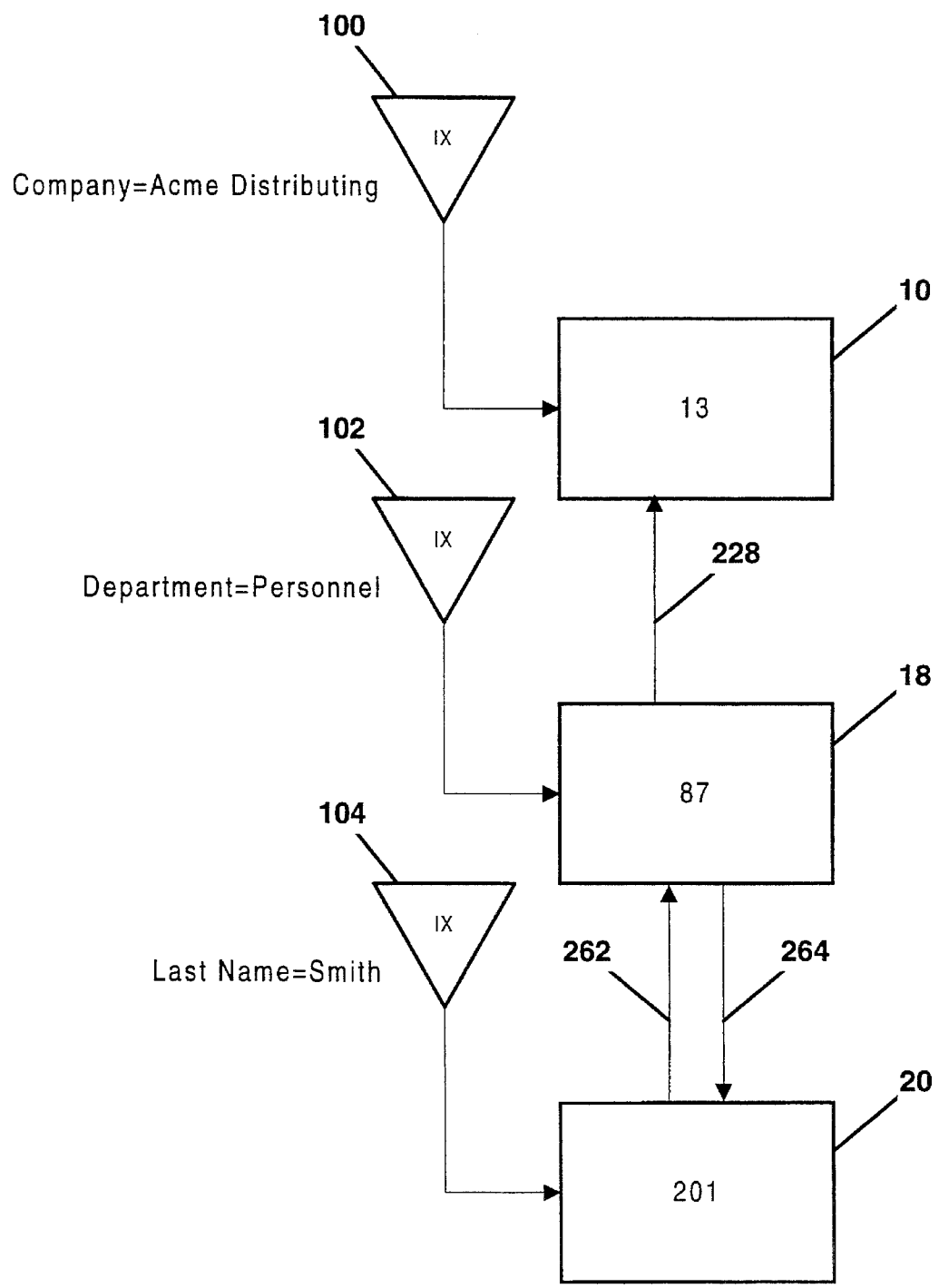
FIG. 3 is a schematic diagram depicting an example of an index structure that can be used in a preferred embodiment of the invention.

The second element necessary for the preferred embodiment is an index structure to point to one or more record identifiers. The schematic diagram of FIG. 3 shows a preferred index structure for a portion of the hierarchy depicted in FIG. 1a. The index structure includes index (IX) pointers 100, 102, and 104, which point to records 13, 87, and 201 (blocks 10, 18, and 20), respectively.

The preferred index structure indicates various attributes of records in the hierarchy with various keys, or keywords. For example, in the portion of the hierarchy depicted FIG. 3, record 13 (block 10) is indexed with the keyword "Company", record 87 (block 18) is indexed with the keyword "Department", and record 201 (block 20) is indexed with the keyword "Last Name". Further, each record is indexed with a keyword value. In the example of FIG. 3, record 13 is indexed with the keyword "Company" set equal to a keyword value of "Acme Distributing", record 87 is indexed with the keyword "Department" set equal to "Personnel", and record 201 is indexed with the keyword "Last Name" set equal to "Smith".

The preferred index structure is used to implement primary and alternate keys for identifying and retrieving individual records in the database. The primary key is preferably formed by concatenating the keyword, the keyword value, and the record identifier. Thus, the primary key for identifying record 13 would be "Company, Acme Distributing, 13". The alternate key is preferably formed by concatenating the record identifier, the keyword, and the keyword value. For example, the alternate (or secondary) key for identifying record 13 would be "13, Company, Acme Distributing". Other embodiments of the invention may utilize further alternate keys (tertiary, quaternary, etc.). In addition, the preferred embodiment has the capability, known to those of skill in the art, to retrieve information using partial keys. Certain uses for the preferred index structure, including the use of primary and alternate keys, are described below; others will be apparent to skilled artisans.

Each of the records depicted in FIGS. 1a–b is indexed with one or more keywords ("Company", "Department", "Location", "Last Name", "First Name", "Children's Names"), as indicated by the keyword value or values shown in the blocks corresponding to each of the records. As may be seen, the index structure of the preferred embodiment has the ability to index any record with multiple keywords. For example, in the hierarchy of FIGS. 1a–b, records 201, 215, 281, 412, and 366 (blocks 20, 22, 24, 30, and 88, respectively) are indexed with three keywords—"Last Name", "First Name", and "Children's Names"—as indicated by the keyword values shown in the blocks corresponding to each of the records.

Search Methodology

Figure 10:
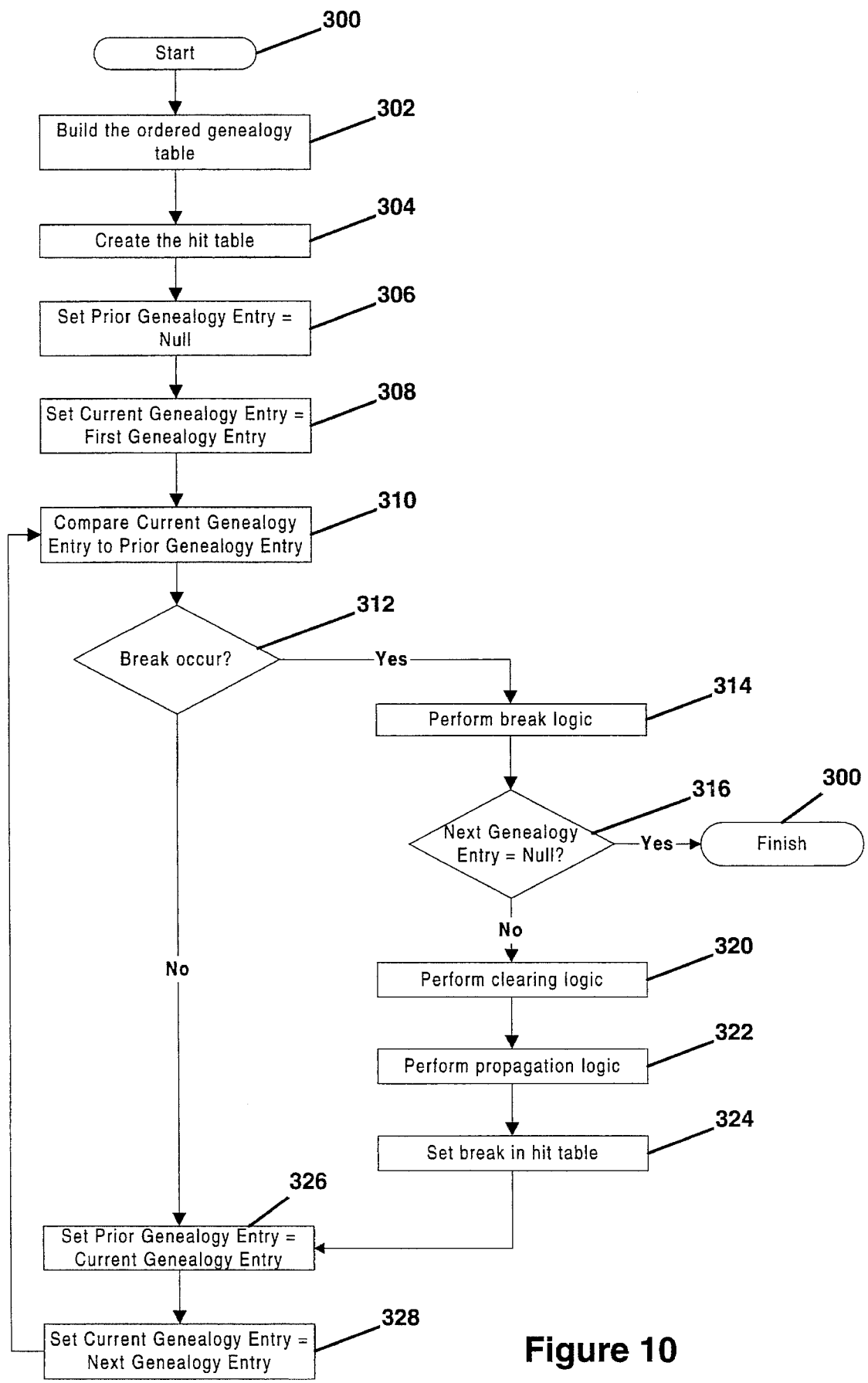
FIG. 10 is a flowchart of a search methodology in accordance with the preferred embodiment of the invention.

A search methodology according to the preferred embodiment of the invention for determining which records meet one or more search criteria is depicted in the flowchart of FIG. 10. FIGS. 4a–za is an example of the processing undertaken by a computer system, utilizing such a search methodology, when performing a search on the hierarchy of FIGS. 1a–b, using as the user-selected search criteria "Last Name=Smith".

Preferably, the search methodology is part of a larger computer system and method. When a user wishes such larger system and method to perform a search on a hierarchical database using certain user-selected search criteria, the processing of the larger system and method invokes the search methodology.

The search methodology comprises the following basic steps:

Step 1

Build the Ordered Genealogy Table

First, a table is constructed to provide the hierarchical database with relational search capabilities. With reference to FIG. 10, processing by the larger system and method proceeds to enter the system and method of the preferred embodiment, as indicated at blocks 300 and 310. Each entry in the table contains the ancestors of each record in the hierarchy that meets user-selected search criteria, and each particular entry in the table is ordered based on the hierarchical level of the particular record. Thus, the table is referred to herein as an "ordered genealogy table". The ordered genealogy table may be maintained in whole or in part in any storage device, but preferably is maintained entirely in main memory, preferably random access memory ("RAM").

Figure 11:
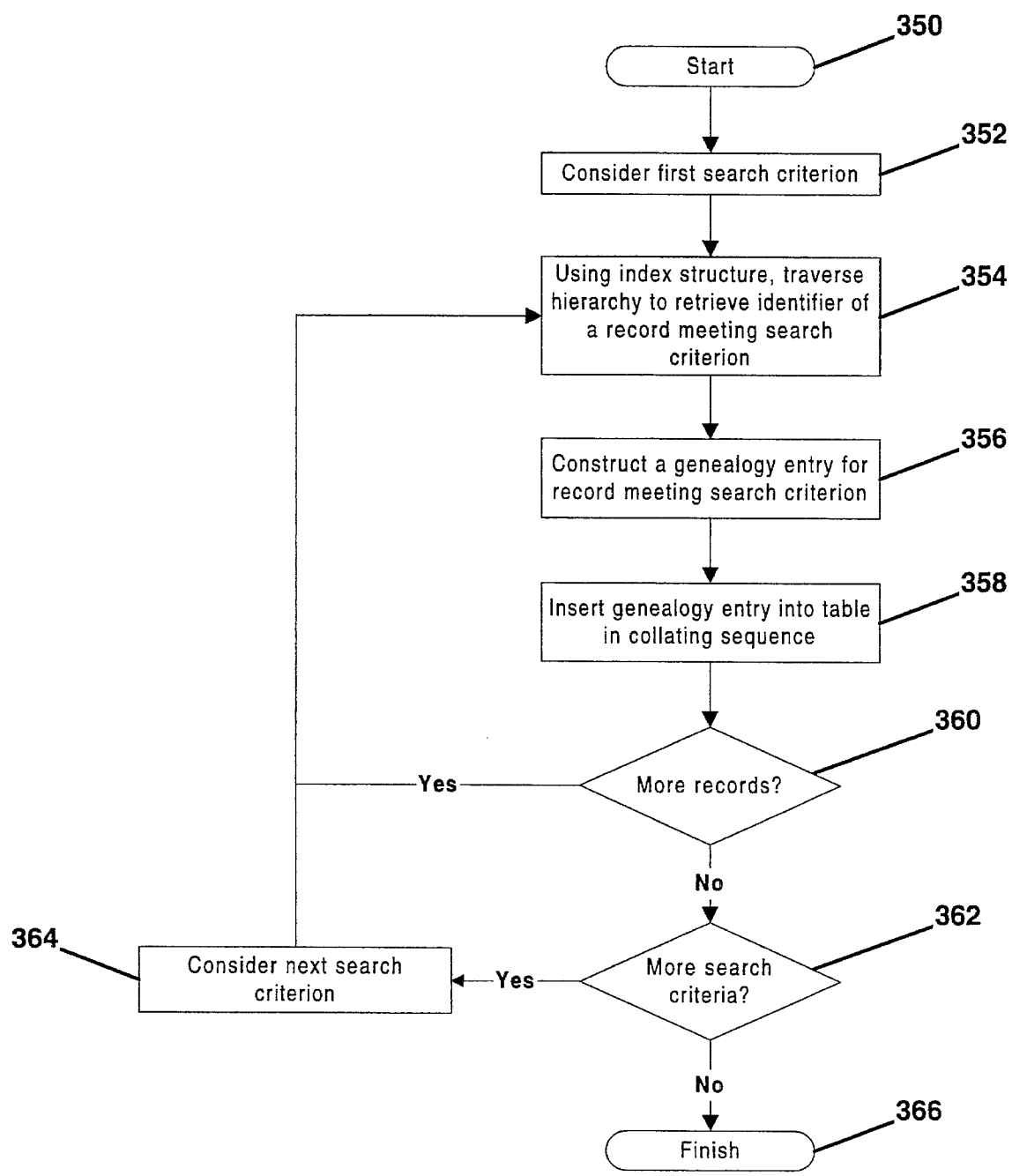
FIG. 11 is a flowchart showing additional detail of one block depicted in FIG. 10.

The step depicted in block 302 of FIG. 10 is described with greater specificity in the flowchart of FIG. 11. As indicated at block 350, processing by the system and method enters from block 302 and proceeds to block 352, where the first user-selected search criterion is considered. Processing continues to block 354, where the index structure is used to retrieve a record that meets one of the search criteria, and then to block 356, where a "genealogy entry" is constructed for such record. In particular, the identifier of each record that meets any one of the search criteria is included in an entry in the genealogy table, the entry further including all the identifiers of that record's ancestors. Furthermore, the record identifiers within each genealogy entry are included in descending order ("descending consanguinity") from the "earliest" ancestor (the highest hierarchical level) to the "latest" descendant (the lowest hierarchical level). In addition, each genealogy entry is preceded by an identifying number of the search criterion.

Next, the genealogy entries are ordered in collating sequence in a list or table of genealogy entries. Preferably, as shown at block 358, this is accomplished by inserting each genealogy entry into the table in collating sequence just after a record is retrieved from the index structure and a genealogy entry is constructed. Collating sequence is determined first by the genealogy itself (i.e., the record identifiers included in the entry) and then by the search criterion number for the genealogy entry.

According to the preferred embodiment, as a part of the processing at block 358, if one entry is a true duplicate of another entry (i.e., criterion number and genealogy are identical for two entries), such a duplicate entry is not included in the genealogy table. In other implementations according to the invention, duplicates can be allowed, or can be deleted after inclusion in the genealogy table.

Following the inclusion of an entry in the ordered genealogy table, processing continues to block 360, where it is determined whether or not there are more records referenced by the index structure that meet the search criterion currently under consideration. If so, processing returns to block 354; if not, processing continues to block 362. There it is determined whether or not there are more search criteria to be considered. If so, processing continues to block 364, where the next search criterion is considered, and then return to block 354; if not, as indicated block 366, processing returns to block 302 in FIG. 10 and continues from there.

For the search criteria shown in FIG. 4a, "Last Name= Smith," FIG. 4b provides an example of the genealogy table built for the hierarchy of FIGS. 1a–b. The table comprises four rows containing four genealogy entries—for records 201, 215, 342, and 500, each of which meet criterion No. 1 (the only search criterion)—and four columns corresponding to the up to four levels contained in the genealogy entries (i.e., Entry Nos. 3 and 4 are for Level 4 records 342 and 500, respectively).

Step 2

Create the Hit Table

For the preferred embodiment, a two-dimensional array must be created for use in determining which of the entries in the ordered genealogy table represent identifiers of records that meet all of the search criteria. The appropriate cells of the array will contain values of "true" to represent each record that meets a search criterion (each record that is a "hit"). Further, the array counts all of the descendants of that record as "hits". This array is referred to as the "hit table".

At a minimum, the hit table must contain as many rows as there are search criteria, and as many columns as the lowest hierarchical level represented in the ordered genealogy table. Preferably, the hit table is dynamically created after the ordered genealogy table is created, so that the hit table contains the minimum configuration. It is further preferred that the cells of the hit table be initialized to a value of "false".

The hit table may also be created with a fixed size; for example, having as the number of rows a maximum number of search criteria allowed by the system, and having as the number of columns the number corresponding to the lowest level of the hierarchy (the highest level number).

FIG. 4d shows the hit table constructed for the search criteria of FIG. 4a.

Step 3

Compare Each Genealogy Entry to the Prior Genealogy Entry

Each genealogy entry is compared to the prior genealogy entry. If there is any inequality in the search criterion number or the record identifiers that make up each of two consecutive genealogy entries, then a "break" is said to exist, and the "break logic" is performed to determine if the prior entry meets all of the search criteria.

Specifically for the preferred embodiment, as shown in FIG. 10, as indicated at block 306, a variable maintained by the system and method for the prior genealogy entry is set to null and, as indicated at block 308, a variable for the current genealogy entry is set to the first genealogy entry in the table. This occurs before the first iteration of the comparison that occurs at block 310.

The processing at block 310 compares the current genealogy entry to the prior genealogy entry. Any inequality between the two entries—with one exception—then the processing at block 312 indicates that a break occurred and processing continues to block 314 where the break logic is performed. The one exception is on the initial iteration of the comparison at block 310 (where the prior genealogy entry is null), in which case a break is not considered to have occurred. In addition, when the prior genealogy entry is set to the last genealogy entry in the table (current genealogy entry set to null), a break is said to occur.

If it is determined at block 312 that no break occurred, processing continues to block 326, where the prior genealogy entry is set to the current genealogy entry from the previous iteration, and then continues to block 328, where the current genealogy entry is set to the next genealogy entry in the table. If there is no next entry (the current entry was the last genealogy table entry), then the current entry is set to null. Processing then returns to block 310.

FIG. 4c shows the genealogy table for the search criteria of FIG. 4a, with the previous genealogy entry set to null ("Does not exist") and the current genealogy entry set to Entry No. 1 (the first entry in the table). FIGS. 4h, 4m, 4r, and 4w show the genealogy table as each iteration of the comparison is performed. FIG. 4w is the situation that exists after the final iteration of the comparison, with the previous genealogy entry set to the Entry No. 4 (the last entry in the table) and the current genealogy entry set to null ("Does not exist").

Step 4

If a break occurred, perform the break logic to determine if the prior genealogy entry contains the identifier of a record that satisfies all of the search criteria For the "break logic" or "break process", as shown at block 314, the true/false values in each column of the hit table are examined beginning with the highest hierarchical level (column 1) and proceeding down through the lowest. The number of the first column in which the values satisfy all the search criteria indicates that, in the previous genealogy entry, at the level corresponding to that column number, is the identifier of a record that meets all of the search criteria.

In the simple example of only AND conditions, the number of true entries in a column is simply totaled. The number of the first column in which the total number of true values equals the number of search criteria corresponds to the level number in the prior entry that contains the identifier of a record that satisfies all the search criteria.

For example, FIG. 4i shows the hit table at the beginning the second iteration of the break process. Because Level 3 contains one value of "true", and the number of search criteria equals one, the previous genealogy entry at Level 3 contains a record (here, record 201) that satisfies the search criteria ("Last Name=Smith").

As will be apparent to skilled artisans, the preferred embodiment can also implement much more complicated search queries. Any query using Boolean algebra may be analyzed by applying the Boolean logic of the search query to each column of the hit table. Specifically, for a query in a Boolean expression, the value in each row is substituted into the element of the Boolean expression corresponding to its search criterion number. For example, in the hierarchy of FIGS. 1a–b in order to find records of the Accounts Receivable ("A/R") departments at Acme Distributing or at Madison Hardware, a query is formulated having the following Boolean expression:

(Company="Acme Distributing" OR Company="Madison Hardware") AND Department="A/R"

When answering a query with these search criteria, as with queries already described, the break process will examine the hit table beginning with Level 1 (Column 1). The value for Row 1 (Criterion No. 1) is substituted for the first element of the search expression (Company="Acme Distributing"), the value for Row 2 (Criterion No. 2) is substituted for the second element of the search expression (Company="Madison Hardware"), and the value for Row 3 (Criterion No. 3) is substituted for the third element of the search expression (Department="A/R"). Upon such substitutions, if evaluation of the search expression results in a value of "true", then the previous genealogy entry contains the identifier of a record that satisfies all of the search criteria.

If a record that satisfies all of the search criteria is found, in the preferred embodiment, the record identifier for that record is returned (or written out) for use by other components of the larger computer system and method of which the invention preferably is a part.

The processing next determines if the break occurred because the prior entry was set to the last entry in the table (i.e., if the current genealogy entry was set to null). If so, as indicated at block 318, the search methodology ends and processing returns to the portion of the larger system and method that invoked the search methodology. If not, processing continues to block 320, where the "clearing logic" is performed.

Step 5

If a break occurred, perform clearing logic

At block 320, the processing begins by determining the level of hierarchy where the break occurred (the "point of difference"). Specifically, the corresponding record identifiers in the current and prior genealogy entries are compared starting with the highest hierarchical level. The first inequality corresponds to the level that is the point of difference. However, if the only difference between the two genealogy entries is a difference in criterion numbers, there is no point of difference and no clearing logic is performed.

After the point of difference is determined, the columns of the hit table at the point of difference (i.e., from the column whose column number corresponds to the point of difference) and all subsequent columns in the hit table are set to false. This is done for all rows in the hit table. The processing at block 320 is thus called "clearing logic" or the "clear process". Processing next continues to block 322, where the "propagation logic" is performed.

FIG. 4j shows the hit table after the second iteration of the clear process. The point of difference is Level 3, and thus all Column 3 and the subsequent column, Column 4, are set to "false".

Step 6

If a break occurred, perform propagation logic

At block 322, if the point of difference was at level 1 (the highest level), nothing is done. Otherwise, the column in the hit table that corresponds to one hierarchical level above (superior to) the point of difference is determined (i.e., the point of difference minus 1). The values in the column superior to the point of difference are then propagated to all the subordinate levels. This is done for all rows in the hit table. The processing at block 322 is thus called "propagating logic" or the "propagate process". Processing next continues to block 324, where the break is "set" in the hit table.

In addition, if there is no point of difference between two genealogy entries (i.e., the only difference between two genealogy entries is a difference in criterion numbers), then no propagation logic is performed.

FIG. 5k shows the hit table after the second iteration of the propagate process for the search criteria of FIG. 5a. As shown in FIG. 5h, the point of difference between the current entry (Entry No. 2) and the prior entry (Entry No. 1) is at Level 2. Thus the values in Column 1 after the clear process, as shown in FIG. 5j, are propagated to all the subsequent levels (Columns 2–4).

Step 7

If a break occurred, set the break in the hit table

At block 324, processing continues to "set the break" in the hit table (or, perform the "set process"). Specifically, in the column corresponding to the lowest level in the current genealogy entry (e.g., 3 record identifiers in the current genealogy entry implies starting at Column 3), and only in the row corresponding to that entry's search criterion number, the value is set to true and that value is propagated to all subordinate levels at that row only. Processing then continues to block 324.

FIG. 4l shows the hit table after the first iteration of the set process. Because the current genealogy entry (Entry No. 1) contains three levels, the value in Column 3 is set to "true" and that value is propagated to the subsequent level, Column 4.

The remainder of FIGS. 4a–za, 5a–zf, 6a–za, 7a–zf, and 8a–zz show the processing for all iterations for five different exemplary search criteria. Additionally, the example of FIGS. 8a–za is for a situation where duplicate genealogy entries are allowed to exist.

Database Conversion Methodology

The ordered genealogy table is a two-dimensional representation of a hierarchy. The width (the number of columns) is equal to the level number of the lowest level in the hierarchy. The height (the number of rows) is representative of the total number of records at the lowest level of the hierarchy.

Therefore, according to another preferred embodiment of the invention, if an ordered genealogy table is constructed so as to contain entries for all the records in a hierarchical database (preferably by searching for all non-null record identifiers), the hierarchical database is converted to a relational database. In other words, an ordered genealogy table containing entries for all the records in the database presents one relational structure for the entire database. Once this relational structure exists, it will be apparent to those skilled in the art that other relational structures may be constructed.

Similarly, according to another preferred embodiment of the invention, a relational database may be converted to a normalized hierarchical database. It will be apparent that other hierarchical structures may be formed.

For example, FIG. 12 schematically depicts data maintained in a relational database. As shown in the schematic processing representations of FIGS. 13a–e, the relational database of FIG. 12 may be converted to an ordered genealogy table.

The preferred system and method for converting from a relational database to a hierarchical database is as follows. First, some of the attributes or keywords of the relational database (i.e., the column headers in FIG. 12) are selected by a user to be the elements on which the hierarchy to be created will be based. In the example of FIGS. 13a–e, there are three keywords chosen on which the hierarchy will be based: "Department", "Company", and "Last Name".

Next, as shown in FIGS. 13a–c, the unique keyword values for each chosen keyword are determined. It is preferable that the highest level of the hierarchy to be created has the fewest number of unique keyword values, with each next subordinate level having the same or the next greater number of unique keyword values (i.e., ascending order of number of keyword values for each hierarchical level). As shown in FIGS. 13a–c, there are seven unique keyword values for the keyword "Department", there are three unique keyword values for the keyword "Company", and there are eight unique keyword values for the keyword "Last Name". Therefore, the keyword "Company" is preferably selected as the keyword for records at Level 1 of the hierarchy, the keyword "Department" is preferably selected as the keyword for records at Level 2 of the hierarchy, and the keyword "Last Name" is preferably selected as the keyword for records at Level 3 of the hierarchy, Next, as shown in FIG. 13d, the columns of the relational database of FIG. 12 are ordered by hierarchical level, in this case, by "Company", then "Department", and then "Last Name", followed by the other columns. Then, as shown in FIG. 13e, the rows are sorted by keyword values. The result is an ordered genealogy table. The contents of this ordered genealogy table are entries for all of the records that will become the lowest level records (i.e., any record with no subordinate entries) in the hierarchy to be created. Because there are record entries in the table for all of the lowest level records, because each record entry contains the anticipated ancestry of that lowest level record, and because the record entries are sequenced in hierarchical order, it will be apparent to those of skill in this art that the complete hierarchy may be constructed from the ordered genealogy table as shown in FIG. 13e.

Figure 14A:
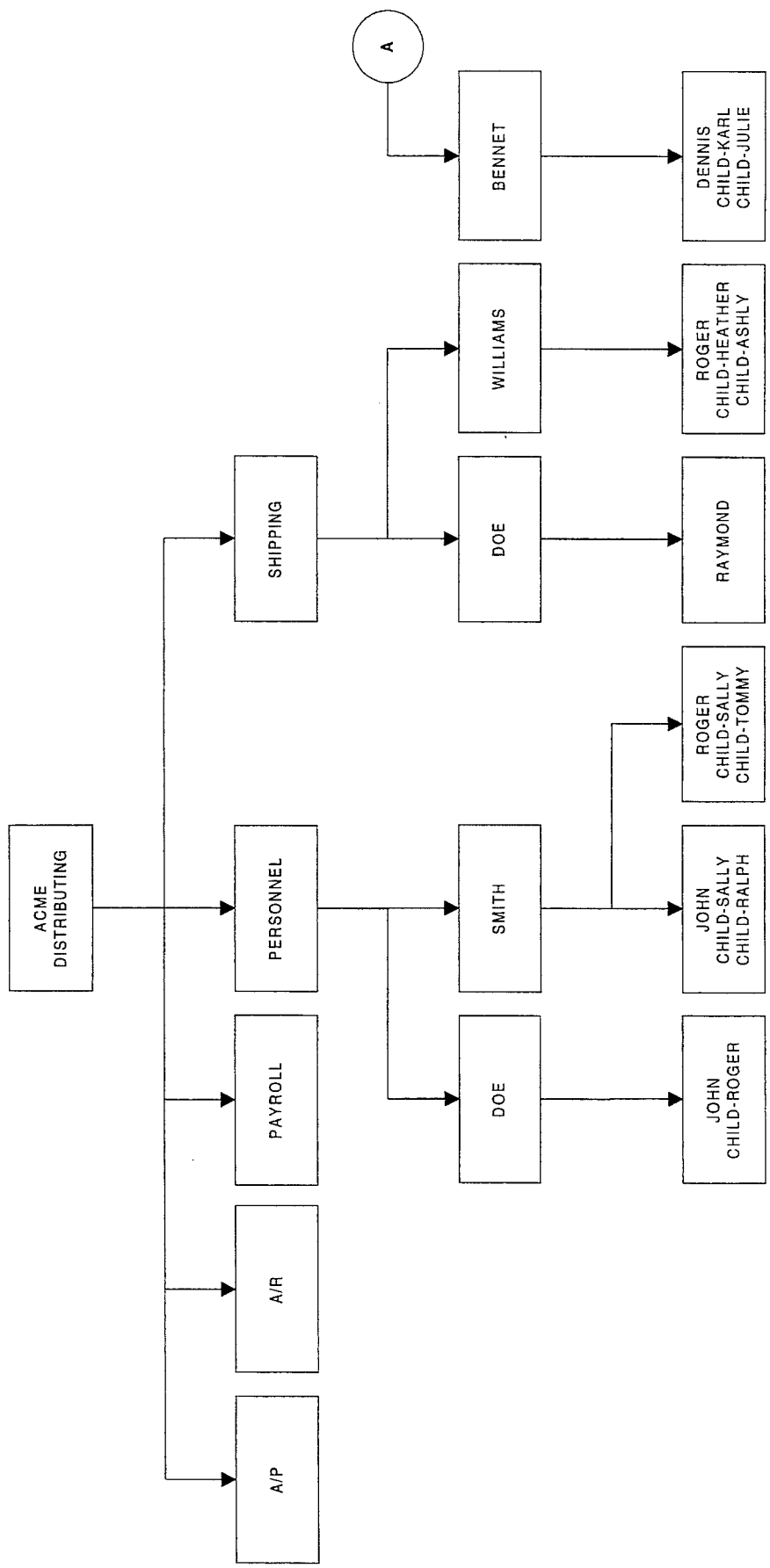
FIGS. 14a–b are schematic diagrams depicting one hierarchical database that can be constructed utilizing a conversion methodology in accordance with a preferred embodiment of the invention.
Figure 14B:
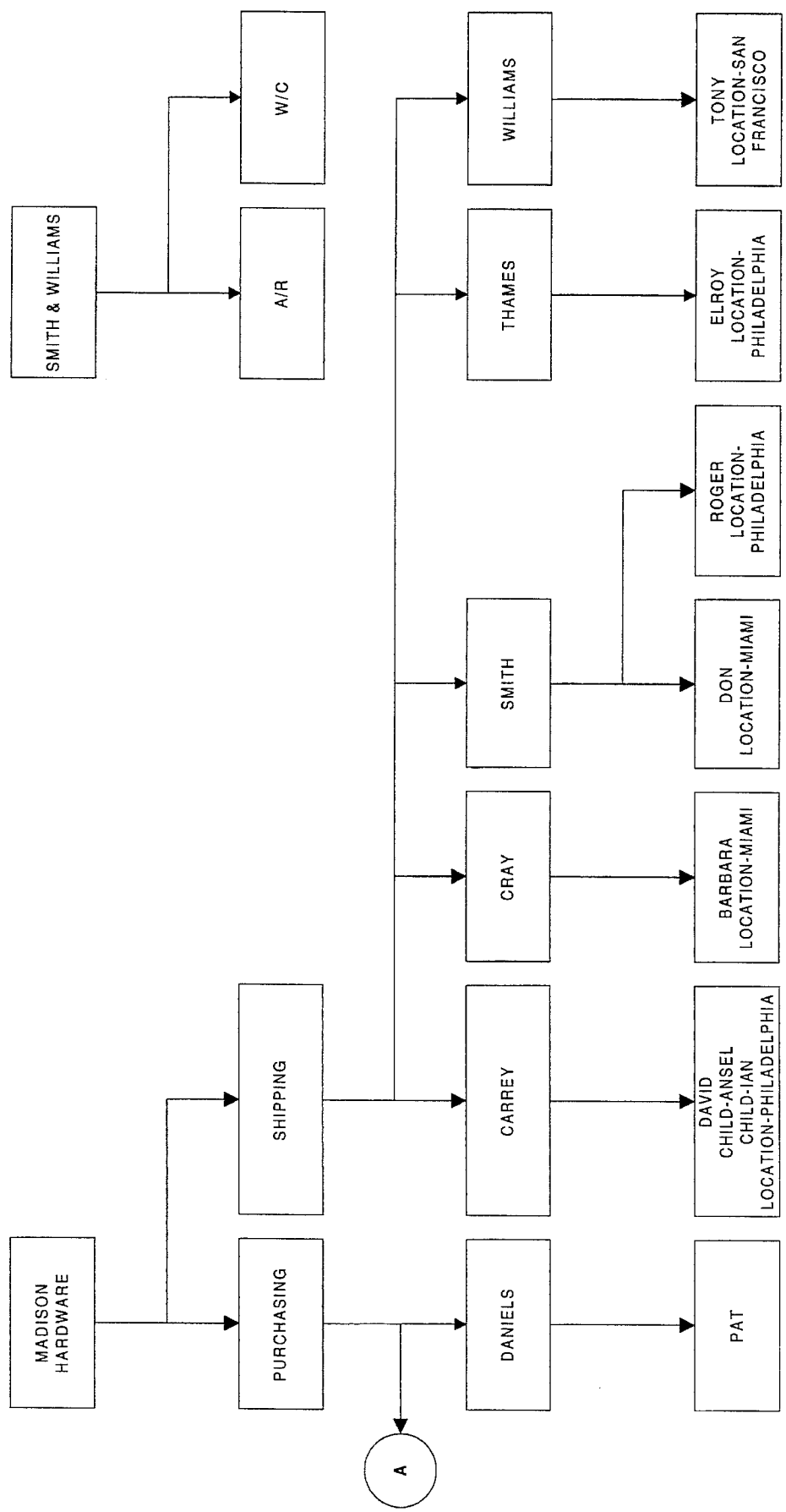
Figure 15A:
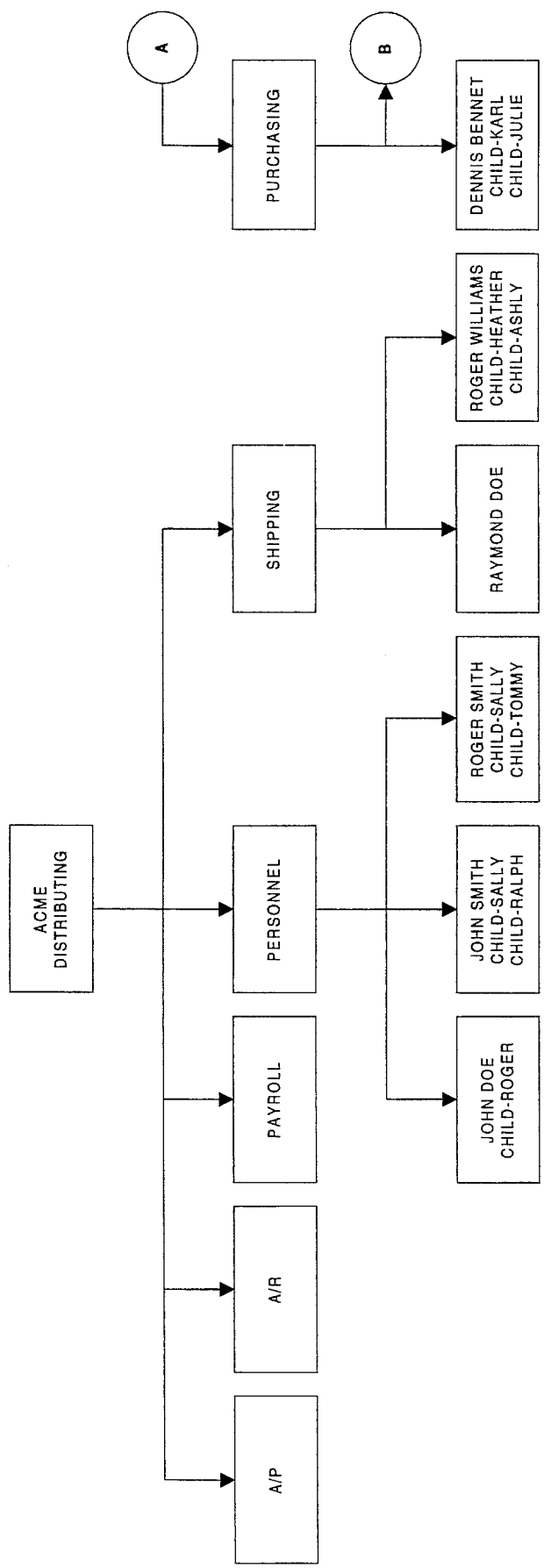
FIGS. 15a–b are schematic diagrams depicting another hierarchical database that can be constructed utilizing a conversion methodology in accordance with a preferred embodiment of the invention.
Figure 15B:
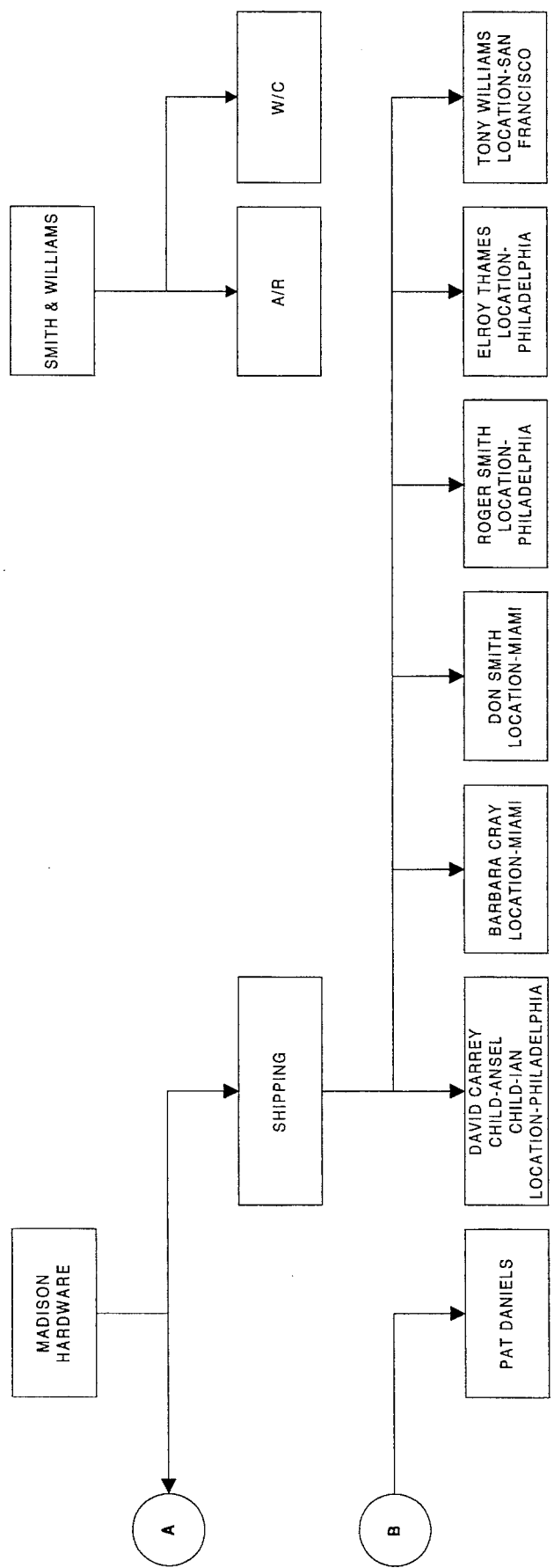

In order to create a hierarchical structure from the ordered genealogy table so created, according to the preferred embodiment, the user must specify where the uniqueness for records at a particular level will end, or, in other words, where the branching will occur. Preferably, this level cannot be the lowest hierarchical level. In the example of the hierarchy in FIGS. 14a–b, the selected uniqueness is through the keyword "Last Name". In the example of FIGS. 15a–b, the hierarchy is said to be unique through the keyword "Company". There may be certain advantages or disadvantages to a user in having the hierarchy of FIGS. 14a–b or FIGS. 15a–b; thus it is a useful capability of the invention to allow a user to choose which hierarchical structure is created from the original relational database (in this example, the relational database of FIG. 12).

Other features and capabilities of this aspect of the invention will be apparent to those of skill in this art. Once a genealogy table is constructed according to the invention, numerous techniques will be apparent for manipulating and optimizing the hierarchical structures that are created. Such techniques may allow for either user-controlled or system-controlled optimization of the hierarchy created. In addition, as will be further apparent, statistical inference techniques may be used in conjunction with the invention for analyzing various hierarchical structures that can be constructed using conversions from relational databases according to the invention.

What is claimed is:

1. A system for maintaining a database in a computer, comprising:

a. a plurality of records maintained in a database;

b. a table creater configured to arrange a subset of the plurality of records into an hierarchical table:

c. each record in the table having a unique identifier and a plurality of pointers configured to point to adjacent records in the hierarchical table; and d. an indexer configured to point to at least one unique identifier in the table.

2. The system of claim 1, wherein the pointers further comprise at least one of:

a. an owner pointer configured to point to a parent record in an immediately higher level in the hierarchical table, and records in a highest level of the hierarchical table having no owner pointer; and b. a subordinate pointer configured to point to a subordinate record in an immediately lower level in the hierarchical table, and records in a lowest level of the hierarchical table having no subordinate pointer.

3. The system of claim 1, wherein the pointers further comprise at least one of:

a. a next record pointer configured to point to a next record in a same level of the record's hierarchical table and a record being alone in the level having the next record pointer point to itself; and b. a previous record pointer configured to point to a previous record in a same level of the record's hierarchical table, and a record being alone in the level having the previous record pointer point to itself.

4. The system of claim 1, wherein the pointers further comprise a first record pointer configured to point to a first record in a same level of the record's hierarchical table, and a record being alone in the level having the first record pointer point to itself.

5. The system of claim 1, wherein the indexer is configured to selectively point to at least one record based on a selected keyword.

6. A method for searching records maintained in a computer database, comprising the steps of:

a. hierarchically arranging an ordered genealogy including records in the database meeting a criteria of a user selected search;

b. creating an array comprising all records satisfying the criteria and genealogical families of said records, the array indicating which records satisfy the criteria;

c. comparing a current genealogical family in the array with an immediate prior genealogical family in the array;

d. determining if an inequality exists between the current and prior families;

e. if an inequality is determined to exist, performing a correcting routine;

f. if either one of (i) no inequality exists and (ii) the correcting routine is completed, continuing the steps of comparing and determining until all records in the array are checked; and g. identifying all records satisfying the search.

7. The method of claim 6, wherein the step of creating an ordered genealogy table further comprises the steps of:

a. searching the database for a record satisfying the criteria;

b. retrieving a record meeting the criteria;

c. constructing a genealogical entry for the retrieved record;

d. inserting the genealogical entry into the table;

e. continuing searching if all records have not been searched; and f. repeating steps a through e until the database has been searched for all criteria of the search.

8. The method of claim 6, wherein the step of creating an array further includes a first step of initializing the array to indicate that no record satisfies the criteria.

9. The method of claim 6, wherein the step of creating an array further includes indicating that all records subordinate to the record satisfying the criteria also satisfy the criteria.

10. The method of claim 6, wherein the step of determining if an inequality exists includes determining if an inequality exists in at least one of (i) a search criteria number and (ii) a record identifier.

11. The method of claim 6, wherein the step of performing the correcting routine further comprises the steps of:

a performing breaking logic on the family;

b. then performing clearing logic on the family;

c. then performing propagation logic on the family; and d. then performing a set process on the family.

12. The method of claim 11, wherein the array is arranged in a plurality of columns and the step of performing the breaking logic further comprises applying Boolean logic of the search on each column of the array to determine an entry satisfying all criteria of the search.

13. The method of claim 11, wherein the step of performing the clearing logic comprises the steps of:

a. determining a record in the current family where a point of difference from the prior family occurs;

b. setting the record where the point of difference occurs to indicate that the criteria is not satisfied; and c. setting all records in the family subordinate to the record where the point of difference occurs to indicate that the criteria is not satisfied.

14. The method of claim 11, wherein the step of performing the propagation logic further comprises:

a. doing nothing if either one of (i) a point of difference occurs at a highest level of the current family and (ii) no point of difference exists between the current and prior families, otherwise;

b. determining in the current genealogical family a level immediately above the level at which the point of difference occurs;

c. determining if the record in the level immediately above satisfies the criteria;

d. if the record satisfies the criteria setting all subordinate levels in the family to indicate that the criteria is satisfied; and e. if the record does not satisfy the criteria, setting all subordinate levels in the family to indicate that the criteria is not satisfied.

15. The method of claim 11, wherein the set process comprises setting a record at a lowest level in the current family and all subordinate levels in the family to indicate that the criteria is satisfied.

* * * * *